United States Patent [19]

Latella et al.

[11] Patent Number: 5,738,954
[45] Date of Patent: Apr. 14, 1998

[54] BATTERY CONTINUATION APPARATUS AND METHOD THEREOF

[75] Inventors: Ricky Latella, Carpentersville; David Lind Weigand, Buffalo Grove; Glenn Charles Goergen, Lake Zurich, all of Ill.

[73] Assignee: Motorola, Inc., Schaumburg, Ill.

[21] Appl. No.: 892,552

[22] Filed: Jul. 14, 1997

Related U.S. Application Data

[63] Continuation of Ser. No. 442,047, May 16, 1995, abandoned.

[51] Int. Cl.$^6$ ........................................... H01M 2/10
[52] U.S. Cl. ........................ 429/97; 429/123; 320/66
[58] Field of Search ........................ 429/97, 99, 123; 320/66

[56] References Cited

U.S. PATENT DOCUMENTS

| | | | |
|---|---|---|---|
| 4,673,861 | 6/1987 | Dubovsky et al. | 320/2 |
| 4,904,549 | 2/1990 | Goodwin et al. | 429/97 |
| 4,965,462 | 10/1990 | Crawford | 307/66 |
| 5,028,806 | 7/1991 | Stewart et al. | 307/66 |
| 5,028,859 | 7/1991 | Johnson et al. | 320/15 |
| 5,136,229 | 8/1992 | Galvin | 320/2 |
| 5,164,652 | 11/1992 | Johnson et al. | 320/2 |
| 5,237,257 | 8/1993 | Johnson et al. | 320/2 |
| 5,242,767 | 9/1993 | Roback et al. | 429/97 |
| 5,306,576 | 4/1994 | Sasaki | 429/98 |
| 5,308,716 | 5/1994 | Shababy et al. | 429/97 |
| 5,314,763 | 5/1994 | Aksoy et al. | 429/97 |
| 5,517,683 | 5/1996 | Collett et al. | 455/89 |
| 5,524,134 | 6/1996 | Gustafson et al. | 379/58 |

FOREIGN PATENT DOCUMENTS

| | | |
|---|---|---|
| 0521609A2 | 5/1992 | European Pat. Off. |
| 0521609A3 | 5/1992 | European Pat. Off. |
| WO80/02248 | 4/1980 | Japan. |
| 5-38057 | 2/1993 | Japan. |
| 856753 | 12/1960 | United Kingdom. |
| WO 87/02848 | 5/1987 | WIPO. |

OTHER PUBLICATIONS

PrivaFone Series 300, Product Summary Sheet, CYCOMM Corporation, HPU-350 & HPU-355 Handheld Privacy Units for the Motorola™ Micro-TAC® series Date unknown.

*Primary Examiner*—Stephen Kalafut
*Attorney, Agent, or Firm*—Mark D. Patrick

[57] ABSTRACT

A battery continuation apparatus (104) contains an electrochemical cell (1039) and a bypass mechanism (1100). When attached to an electronic device (100), the bypass mechanism (1100) selectively connects the one electrochemical cell (1039) to power the electronic device (100) or selectively bypasses the electrochemical cell (1039) when a battery pack (102) or an additional battery continuation apparatus (2001) having a second source of power is coupled to the battery continuation apparatus (104).

20 Claims, 14 Drawing Sheets

— PRIOR ART —

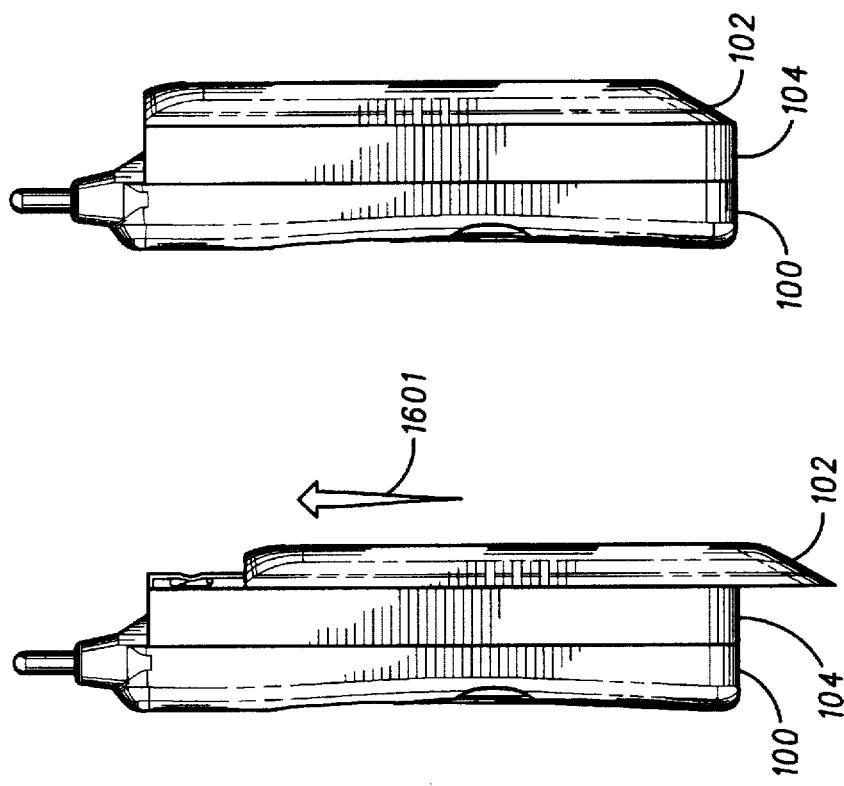
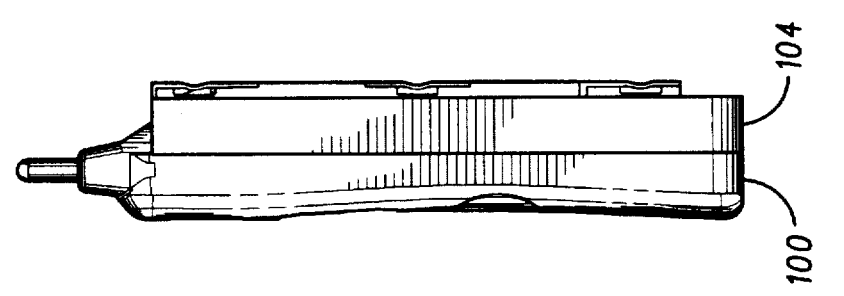
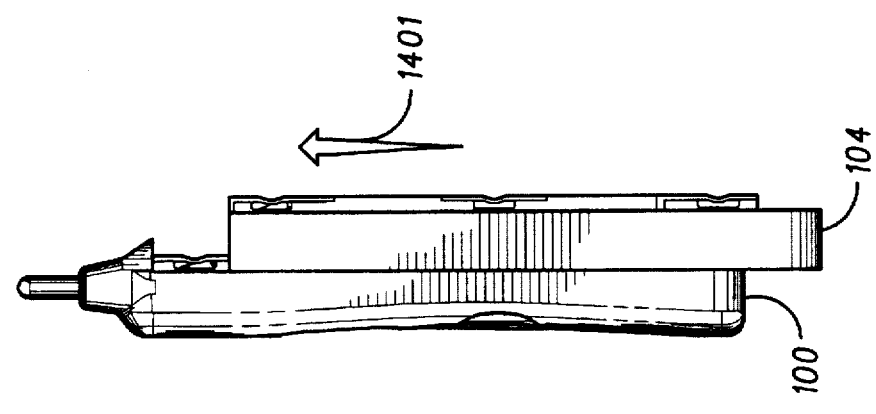

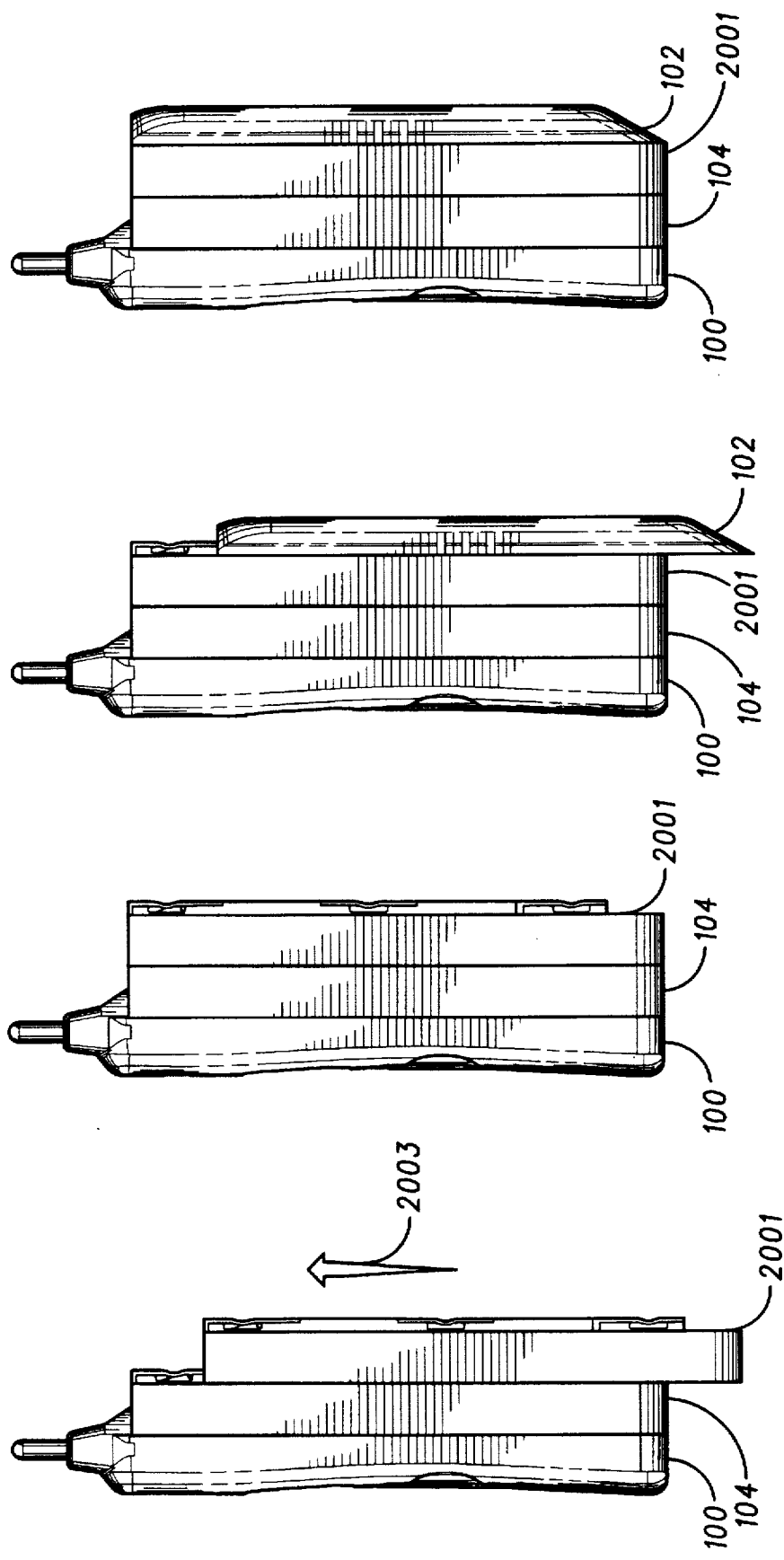

BATTERY CONTINUATION APPARATUS AND METHOD THEREOF

This is a continuation of application Ser. No. 08/443,047, filed May 16, 1995 and now abandoned.

BACKGROUND OF THE INVENTION

1. Field of the Invention

The invention generally relates to batteries and more specifically to a battery apparatus for a device.

2. Description of Related Art

In recent years, improvements in battery technology and electronic device efficiency have made portable electronic devices popular. While once requiring power from a conventional wall outlet or a vehicle's ignition system, electronic devices, such as computers or cellular radiotelephones, can now be powered by lightweight batteries. Such batteries are typically in the form of a rechargeable battery pack—multiple rechargeable electrochemical cells disposed within a housing—manufactured to attach to portable electronic devices. Upon attachment, electrical contacts carried on the battery pack housing contact mating contacts carried on the portable electronic device housing to connect the electrochemical cells of the battery to the circuitry in the device. The portable electronic device operates until the electrochemical cells within the battery pack become depleted.

Once depleted, the user typically removes the depleted battery pack and attaches another charged battery pack to continue operation of the portable electronic device. However, removal of the battery pack, even momentarily, effectively disconnects the portable electronic device from its power source and, thus, interrupts operation thereof. Where a portable radiotelephone user is participating in a call, removal of the battery pack causes the call to be terminated.

Therefore, what is needed is an apparatus and method that permits the user to extend the operation of the device without interruption.

BRIEF DESCRIPTION OF THE DRAWINGS

FIG. I illustrates a front, right side, and top perspective view of a portable electronic device with a battery continuation apparatus and a battery pack attached thereto;

FIG. 14 illustrates a step of positioning the battery continuation apparatus for attachment to the portable electronic device;

FIG. 15 illustrates a step of completely attaching the battery continuation apparatus to the portable electronic device;

FIG. 16 illustrates a step of positioning a battery pack for attachment to the battery continuation apparatus;

FIG. 18 illustrates a step of completely attaching the battery pack to the battery continuation apparatus;

FIG. 20 illustrates a step of positioning a second battery continuation apparatus for attachment to the battery continuation apparatus of FIG. 15;

FIG. 21 illustrates a step of completely attaching the second battery continuation apparatus to the battery continuation apparatus of FIG. 15;

FIG. 22 illustrates a step of positioning a battery pack for attachment to the second battery continuation apparatus;

FIG. 23 illustrates a step of completely attaching the battery pack to the second battery continuation apparatus.

DETAILED DESCRIPTION OF THE DRAWINGS

A battery continuation apparatus includes a housing, a first contact positioned on the housing to connect to a first device, an electrochemical cell positioned in the housing for providing a first source of power to the first device, and a bypass mechanism. The bypass mechanism is coupled to the electrochemical cell and to the first contact for selectively connecting the electrochemical cell to the first contact and for selectively bypassing the electrochemical cell when a second device including a second source of power is coupled to the battery continuation apparatus. A novel method of providing power to the portable electronic device is realized by the battery continuation apparatus. The electrochemical cell of the battery continuation apparatus powers the portable electronic device or the apparatus bypasses the electrochemical cell to couple power to the portable electronic device from an external power source.

Figure 1:
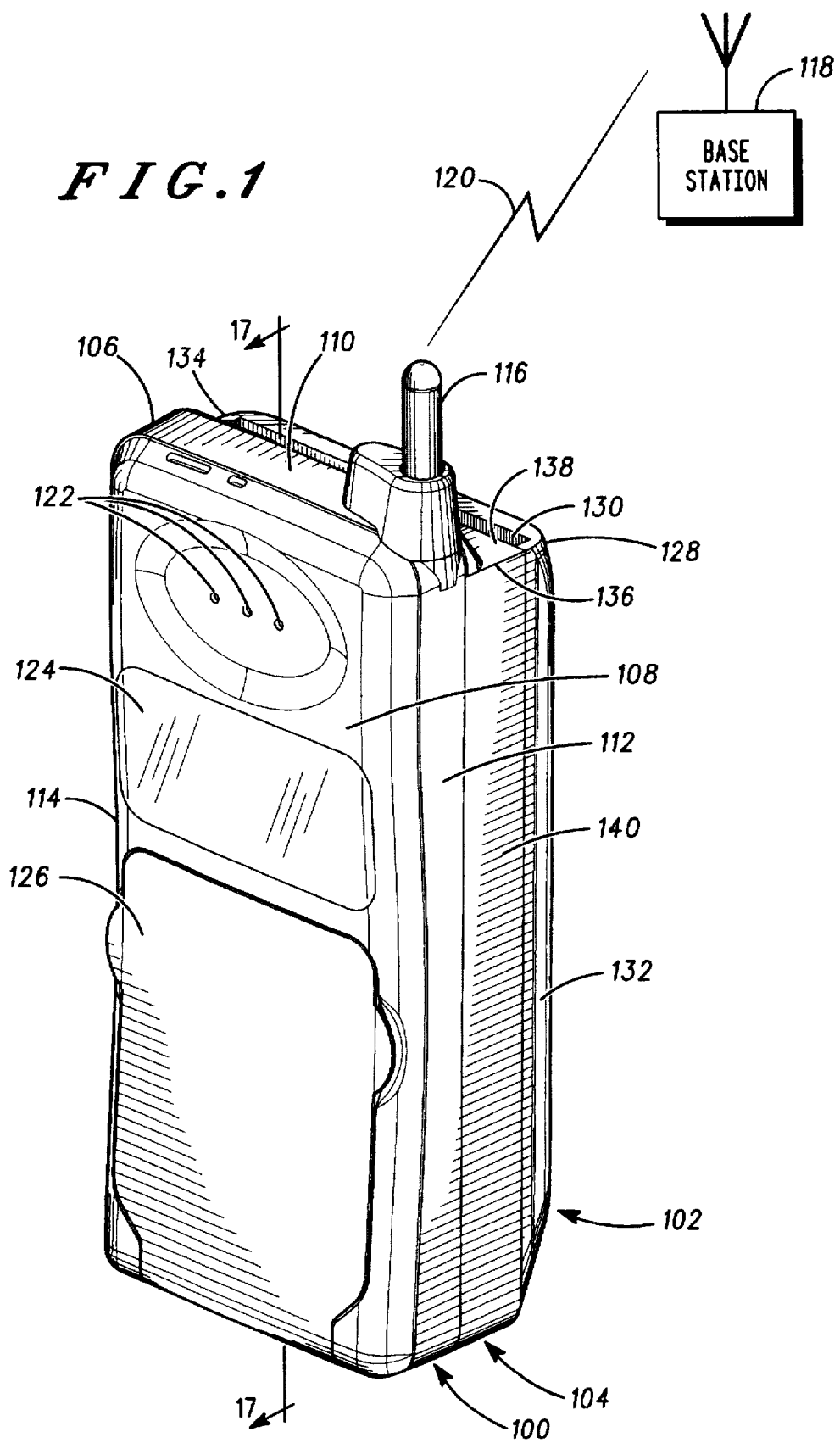

A portable radiotelephone 100, a battery pack 102, and a battery continuation apparatus 104 are illustrated in FIG. 1 attached. In this configuration, power is provided to the portable radiotelephone 100 by the battery pack 102 through the battery continuation apparatus 104, which is bypassed. The portable radiotelephone 100 may be any commercially available portable cellular telephone, such as MicroTAC radiotelephones manufactured and sold by Motorola, Inc. Although the portable radiotelephone 100 is illustrated and described, it will be recognized that any one of a number portable electronic devices, such as lap top computers, camcorders, pagers, two way radios, personal digital assistants, and the like, could utilize the battery continuation apparatus 104 and method thereof as described hereinbelow.

The portable radiotelephone 100 includes a radiotelephone housing 106. The radiotelephone housing 106 is preferably molded from a suitable polymer material, such as polycarbonate. The radiotelephone housing 106 includes a front surface 108, a top surface 110, a right side surface 112, and a left side surface 114 (not visible in FIG. 1). A retractable antenna 116 extends from the top surface 110. The retractable antenna 116 is coupled to a transceiver circuit, which is not shown because it is disposed within the radiotelephone housing 106, and permits the portable radiotelephone 100 to operate in a cellular radiotelephone environment by communicating with a fixed site cellular base station 118 via radio frequency waves 120.

The front surface 108 includes a series of speaker openings 122 located above a display 124 that is located above a hinged lid 126. Positioned behind the series of speaker openings 122 and out of view is a speaker from which a user is audibly alerted that the battery pack 102 providing power to the portable radiotelephone 100 is nearing depletion. Similarly, the display 124, which may be a liquid crystal display (LCD) or a light emitting diode (LED) type display, visually alerts the user as to the depletion of the battery pack 102. The hinged lid 126, shown in a closed position, conceals a keypad (not shown) from which the user typically powers the portable radiotelephone 100 on and off as well as initiates calls by inputting and sending numbers.

Figure 2:
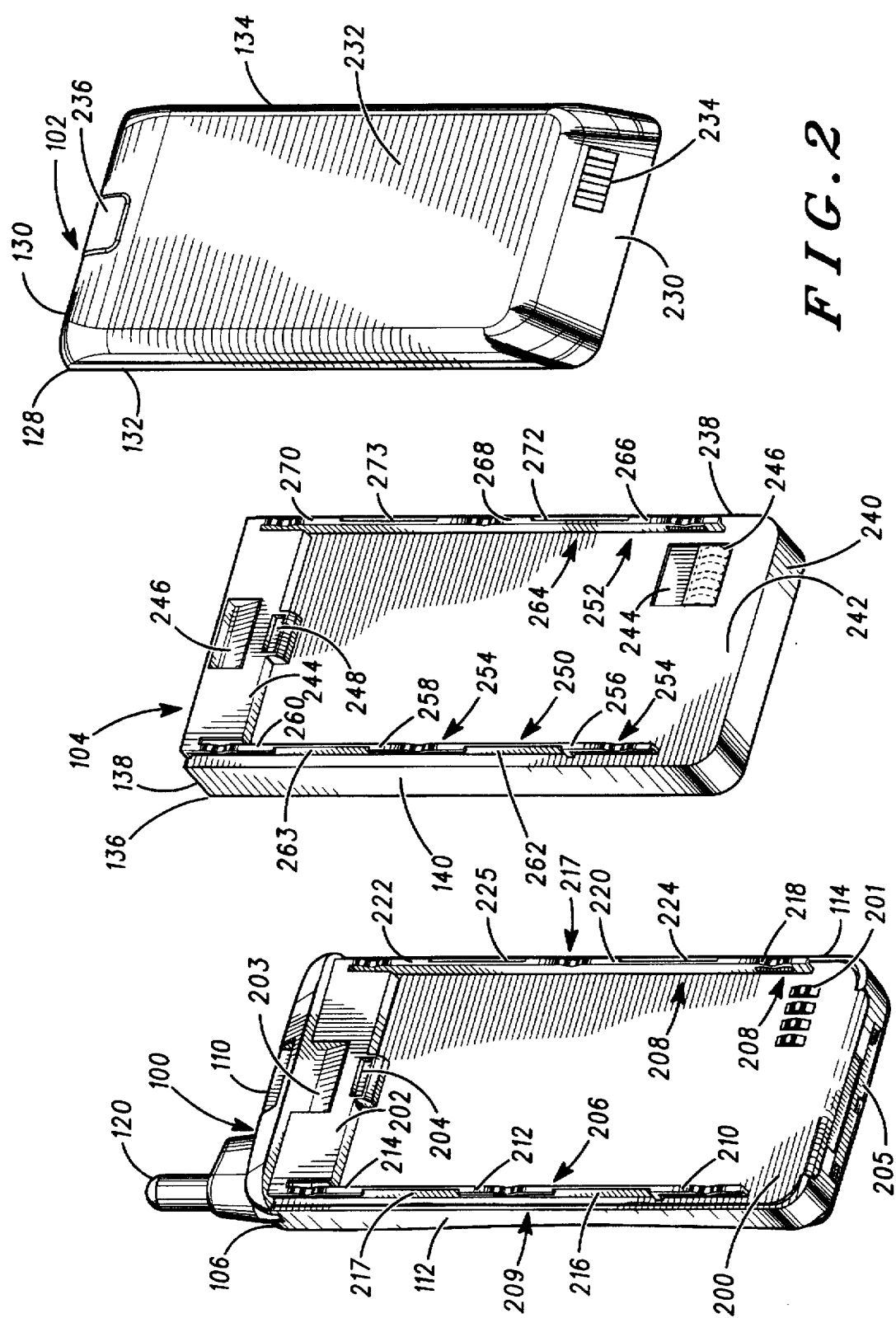
FIG. 2 illustrates a rear, right side, and bottom perspective view of the portable electronic device of FIG. 1 with both the battery continuation apparatus and the battery pack detached therefrom.

The radiotelephone housing 106 includes a rear surface 200 and a bottom surface 205 as shown in FIG. 2. The rear surface 200 includes projecting contacts 201 for connection to a battery power source to operate the transceiver circuit contained within the radiotelephone housing 106. The rear surface 200 includes a raised area 202 located on an upper area thereof. The raised area 202 includes an indent 203 disposed above a rectangular recess 204. The indent 203 and the rectangular recess 204, which will be further discussed below, are dimensioned to facilitate attachment and detachment of the continuation apparatus 104, or the battery pack 102, and the portable radiotelephone 100.

The rear surface 200 includes a first rail 206 and a second rail 208 for attaching the battery continuation apparatus 104 or the battery pack 102 to the portable radiotelephone 100. The first and second rails 206, 208 extend from the rear surface 200 to a height so as to be flush with the raised area 202. The first rail 206 is substantially a mirror image of the second rail 208. The first rail 206 extends longitudinally along the rear surface 200, and in close proximity and parallel to the right side surface 112. The first rail 206 includes a first set of ledges 209. The first set of ledges 209 is comprised of a first bottom ledge 210, a first middle ledge 212, and a first top ledge 214. The first set of ledges 209 extend outward from a top of the first rail 206 in a direction toward the right side surface 112. Each of the first set of ledges 209 are evenly spaced along the first rail 206 and interposed by a first lower gap 216 and a first upper gap 217.

The second rail 208 extends longitudinally along the rear surface 200, and in close proximity and parallel to the left side surface 114. The second rail 208 includes a second set of ledges 217. The second set of ledges 217 includes a second bottom ledge 218, a second middle ledge 220, and a second top ledge 222. The second set of ledges 217 extend outward from a top of the second rail 208 in a direction toward the left side surface 114. Each of the second set of ledges 217 are evenly spaced along the second rail 208 and interposed by a second lower gap 224 and a second upper gap 225.

Figure 3:
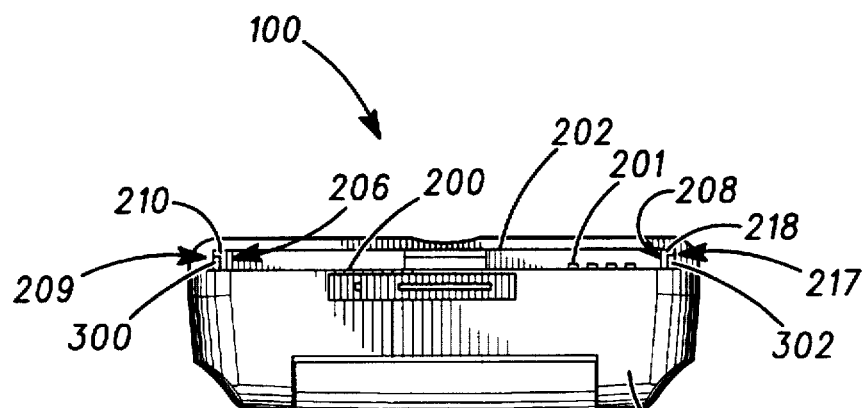
FIG. 3 illustrates a bottom plan view of the portable electronic device of FIG. 1.

The orientation of the first and second set of ledges 209, 217 with respect to the respective first and second rails 206, 208 is better shown in FIG. 3. The first bottom ledge 210 extends orthogonally from the top of the first rail 206 forming a first bottom open area 300. Similarly, the second bottom ledge 218 extends orthogonally from the top of the second rail 208 forming a second bottom open area 302. An open area similar to the first and second bottom open areas 300 and 302 also exists beneath the other ledges of first and second set of ledges 209, 217. The open areas permit abutment and interlocking of the first and second set of ledges 209, 217 with mating ledges of the battery continuation apparatus 104 and the battery pack 102.

Referring back to FIGS. 1 and 2, the battery pack 102, which may be any conventional, commercially available power source for the portable radiotelephone 100, such as the Nickel Cadmium Standard Battery, Model No. SNN4132, manufactured and sold by Motorola, Inc., includes a battery pack housing 128. The battery pack housing 128 is preferably molded from a suitable polymer material, such as polycarbonate, to dimensionally correspond to the battery continuation apparatus 104 and the portable radiotelephone 100. The battery pack housing 128 includes a top surface 130, a right side surface 132, a left side surface 134 (not visible), a bottom surface 230, and a rear surface 232. Although not shown in FIGS. 1 and 2, the battery pack housing 128 contains electrochemical cells. The bottom surface 230 includes recharging contacts 234 coupled to the electrochemical cells and the rear surface 232 includes an actuatable release button 236 forming a portion of a flexible latch mechanism further discussed in conjunction with FIG. 4.

Figure 4:
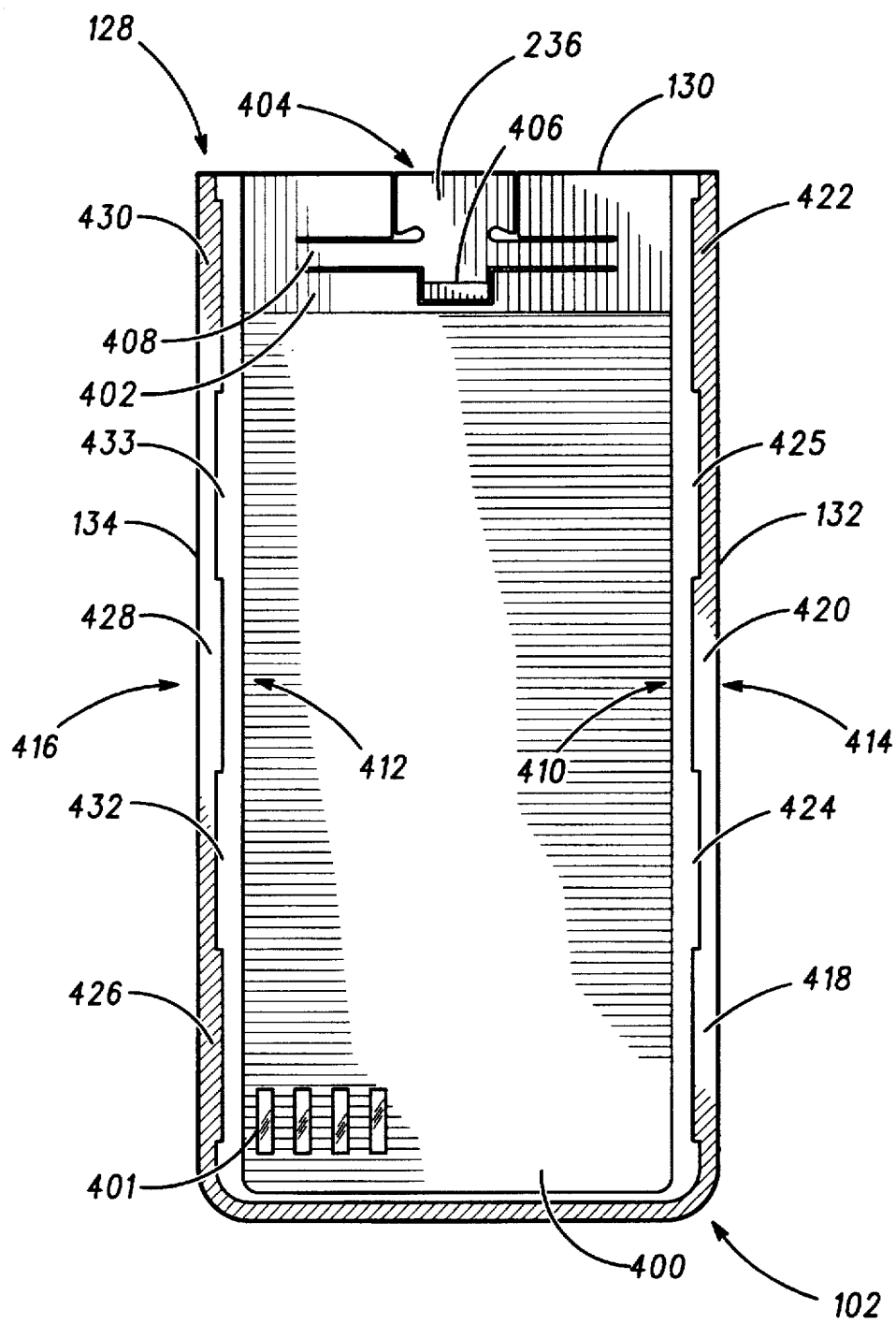
FIG. 4 illustrates a front elevational view of the battery pack of FIG. 1.

The battery pack housing 128 includes a front surface 400 as shown in FIG. 4. The front surface 400 of the battery pack housing 128 includes flat contacts 401. Although not shown in FIG. 4, it will be recognized that the flat contacts 401 are electrically coupled to electrochemical cells disposed within the battery pack housing 128. The flat contacts 401 are positioned on the front surface 400 to make contact with the projecting contacts 201 of the portable radiotelephone 100 (see FIG. 2) when the battery pack 102 is attached to the portable radiotelephone 100. When in such contact, and while charged, the battery pack 102 provides power to the portable radiotelephone 100.

The front surface 400 of the battery pack housing 128 includes a recessed area 402 molded into an upper portion thereof. The recessed area 402 is dimensioned to correspond to and accommodate the raised area 202 of the rear surface 200 of the radiotelephone housing 106 (see FIG. 2). The recessed area 402 includes a flexible latch mechanism 404 integrally molded with the battery pack housing 128. The flexible latch mechanism 404 functions to maintain the battery pack 102 in attachment with the portable radiotelephone 100. The flexible latch mechanism 404 includes the actuatable release button 236, as previously discussed in conjunction with FIG. 2. The flexible latch mechanism 404 includes a projecting catch 406 and a torsion bar 408. The torsion bar 408 is coupled between the actuatable release button 236 and the projecting catch 406. The torsion bar 408 biases the flexible latch mechanism 404 to the position illustrated in FIG. 5. In this position, the projecting catch 406 will be received in the rectangular recess 204 when the battery pack 102 is fully attached to the portable radiotelephone 100. The flexible latch mechanism 404 is actuated to remove the projecting catch 406 from the rectangular recess 204 by pressing a rear surface of the actuatable release button 236. Such pressing causes rotation about the torsion bar 408 causing the projecting catch 406 to retract into the recessed area 402 and out of the rectangular recess 204.

A first channel 410 and a second channel 412 are molded into the front surface 400. The first and second channels 410, 412 extend below the front surface 400 to a depth substantially equal to that of the recessed area 402. The first and second channels 410, 412 extend longitudinally along the front surface 400, and in close proximity and parallel to the right side surface 132 and the left side surface 134, respectively. A first set of mating ledges 414 and a second set of mating ledges 416 are disposed above the first and second channels 410, 412, respectively. The first set of mating ledges 414, including a first bottom mating ledge 418, a first middle mating ledge 420, and a first top mating ledge 422, extend partially into the first channel 410 from the right side surface 132. Each of the first set of mating ledges 414 are evenly spaced along the along the first channel 410 and interposed by a first lower mating gap 424 and a first upper mating gap 425.

The second set of mating ledges 416, which are substantially a mirror image of the first set of mating ledges 414, extend partially into the second channel 412 from the left side surface 134. The second set of mating ledges 416 includes a second bottom mating ledge 426, a second middle mating ledge 428, and a second top mating ledge 430. Each of the second set of mating ledges 416 are evenly spaced along the second channel 412 and interposed by a second lower mating gap 432 and a second upper mating gap 433.

Figure 5:
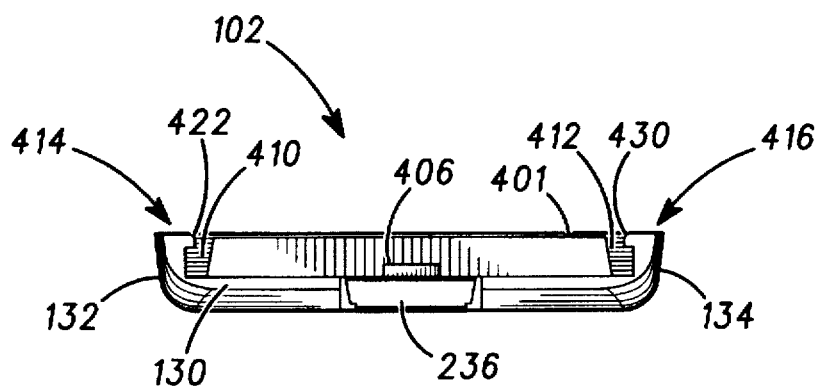
FIG. 5 illustrates a top plan view of the of the battery pack of FIG. 1.

The orientation of the first and second set of mating ledges 414, 416 with respect to the first and second channels 410 and 412 is shown in FIG. 5. The first top mating ledge 422 of the first set of mating ledges 414 extends partially into the first channel 410 from the right side surface 132. Similarly, the second top mating ledge 430 of the second set of mating ledges 416 extends partially into the second channel 412 from the left side surface 134.

The battery continuation apparatus 104 of FIG. 1 includes a battery continuation apparatus housing 136. The battery continuation apparatus housing 136 is preferably molded from a suitable polymer material, such as polycarbonate, to dimensionally correspond to the portable radiotelephone 100 and the battery pack 102. The battery continuation apparatus housing 136 includes a top surface 138 and a right side surface 140. The battery continuation apparatus housing 136 also includes a left side surface 238 (not visible), a bottom surface 240, and a rear surface 242 as shown in FIG. 2. The rear surface 242 includes a slidable housing member 244 carried thereon. The slidable housing member 244 conceals retractable contacts 246 (shown in dashed lines) disposed therebehind.

Aside from the slidable housing member 244, the rear surface 242 of the battery continuation apparatus 104 is substantially similar in form and function to the rear surface 200 of the portable radiotelephone 100. The rear surface 242 includes a raised area 244 located on an upper area thereof. The raised area 244 includes an indent 246 disposed above a rectangular recess 248 for maintaining attachment of the battery pack 102.

The rear surface 242 includes a first rail 250 and a second rail 252. The first and second rails 250, 252 extend from the rear surface 242 to a height so as to be flush with the raised area 244. The first rail 250 is substantially a mirror image of the second rail 252. The first rail 250 extends longitudinally along the rear surface 242, and in close proximity and parallel to the right side surface 140. The first rail 250 includes a first set of ledges 254. The first set of ledges 254 is comprised of a bottom ledge 256, a first middle ledge 258, and a first top ledge 260 which extend substantially parallel to one another. The first set of ledges 254 extend outward from a top of the first rail 250 in a direction toward and the right side surface 140. Each of the first set of ledges 254 are evenly spaced along the first rail 250 and interposed by a first lower gap 262 and a first upper gap 263. The second rail 252 extends longitudinally along the rear surface 242, and in close proximity and parallel to the left side surface 238. The second rail 252 includes a second set of ledges 264. The second set of ledges 264 includes a second bottom ledge 266, a second middle ledge 268, and a second top ledge 270 which extend substantially parallel to one another. The second set of ledges 264 extend outward from a top of the second rail 252 in a direction toward the left side surface 238. Each of the second set of ledges 264 are evenly spaced along the second rail 252 and interposed by a second lower gap 272 and a second upper gap 273.

Figure 6:
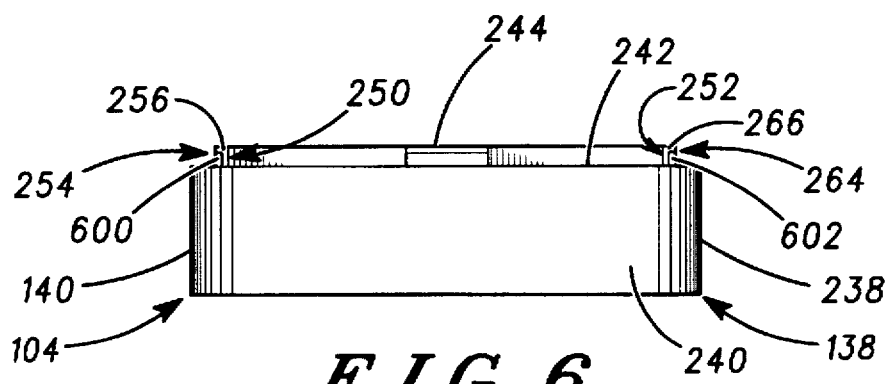
FIG. 6 illustrates a bottom plan view of the battery continuation apparatus of FIG. 1.

The orientation of the first and second set of ledges 254, 264 with respect to the respective first and second rails 250, 252 is shown in FIG. 6. The first bottom ledge 256 extends substantially orthogonally from the top of the first rail 250 forming a first bottom open area 600. Similarly, the second bottom ledge 266 extends substantially orthogonally from the top of the second rail 252 forming a second bottom open area 602. An open area similar to the first and second bottom open areas 600, 602 also exists beneath the other ledges of first and second set of ledges 254, 264. The open areas permit abutment and interlocking of the first and second set of ledges 254, 264 with the first and second set of mating ledges 414, 416 of the battery pack 102 or mating ledges of a second battery continuation apparatus.

Figure 7:
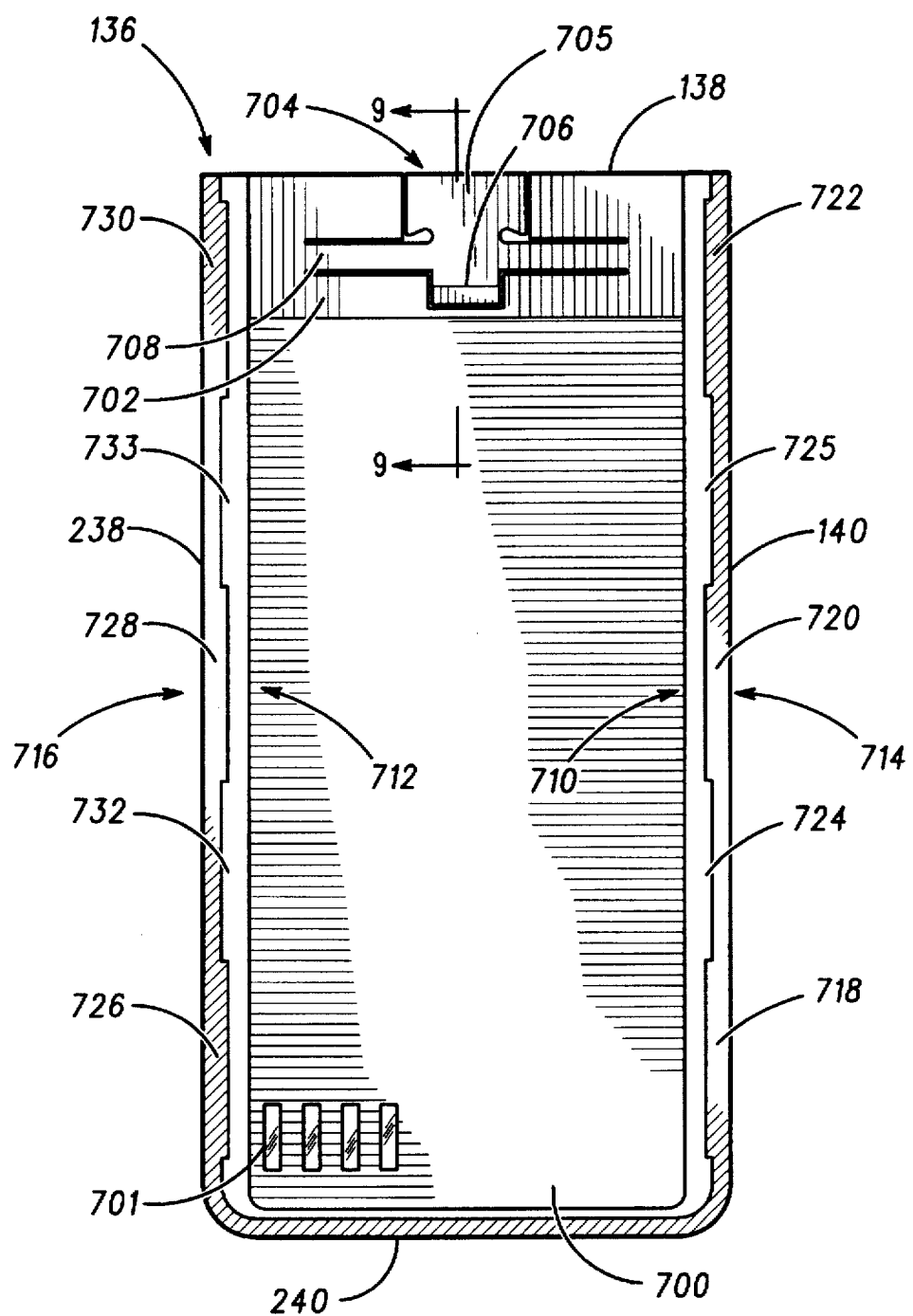
FIG. 7 illustrates a front elevational view of the battery continuation apparatus of FIG. 1.

The battery continuation apparatus housing 136 includes a front surface 700 as shown in FIG. 7, which illustrates a front elevational view of the battery continuation apparatus 104. The front surface 700 is substantially similar in both form and function to the front surface 400 of the battery pack 102 shown in FIG. 4. The front surface 700 includes flat contacts 701. Although not shown in FIG. 7, the flat contacts 701 are electrically coupled to the electrochemical cells disposed within the battery continuation apparatus housing 136.

The front surface 700 includes a first channel 710 and a second channel 712 molded therein. The first and second channels 710, 712 extend longitudinally along the front surface 700, and in close proximity and parallel to the right side surface 140 and the left side surface 238, respectively. A first set of mating ledges 714 and a second set of mating ledges 716 are disposed above the first and second channels 710, 712, respectively. The first set of mating ledges 714, including a first bottom mating ledge 718, a first middle mating ledge 720, and a first top mating ledge 722, extend partially into the first channel 710 from the right side surface 140 and extend substantially parallel to one another. Each of the first set of mating ledges 714 are evenly spaced along the first channel 710 and interposed by a first upper mating gap 724 and a second upper mating gap 725. The second set of mating ledges 716, which are substantially a mirror image of the first set of mating ledges 714, extend partially into the second channel 712 from the left side surface 238. The second set of mating ledges 716 includes a second bottom mating ledge 726, a second middle mating ledge 728, and a second top mating ledge 730 which extend substantially parallel to one another. Each of the second set of mating ledges 716 are evenly spaced along the second channel 712 and interposed by a second lower mating gap 732 and a second upper mating gap 733.

Figure 8:
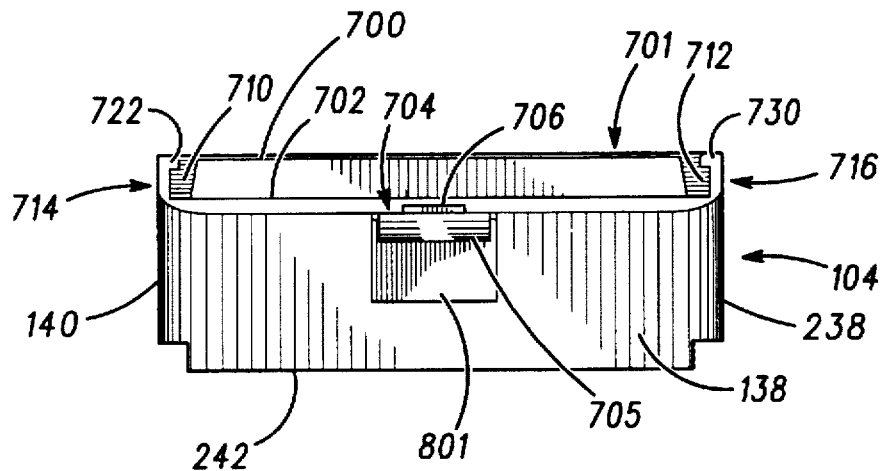
FIG. 8 illustrates a top plan view of the of the battery continuation apparatus of FIG. 1, showing a flexible latch mechanism.

The orientation of the first and second set of mating ledges 714, 716 with respect to the first and second channels 710 and 712 is better shown in FIG. 8. The first top mating ledge 722 of the first set of mating ledges 714 extends partially into the first channel 710 from the right side surface 140. Similarly, the second top mating ledge 730 of the second set of mating ledges 716 extends partially into the second channel 712 from the left side surface 238.

The front surface 700 includes a recessed area 702 molded into an upper portion thereof. The recessed area 702 includes a flexible latch mechanism 704 that is integrally molded with the battery continuation apparatus housing 136. The flexible latch mechanism 704 includes an actuatable release button 705, a projecting catch 706, and a torsion bar 708 flexibly mounted therebetween. The flexible latch mechanism 704 functions to maintain the battery continuation apparatus 104 in attachment with the portable radiotelephone 100. The operation of the flexible latching mechanism 704 and its variation with the flexible latch mechanism 404 of the battery pack is further described in reference to FIGS. 8 and 9.

In FIG. 8, the actuatable release button 705 extends rearwardly from into a notch 801 adjacent the top surface 138 of the battery continuation apparatus housing 136. The notch 801 is sized to permit a user to easily access the actuatable release button 705 when the battery continuation apparatus 104 is coupled between the portable radiotelephone 100 and the battery pack 102 (see FIG. 1, for example).

Figure 9:
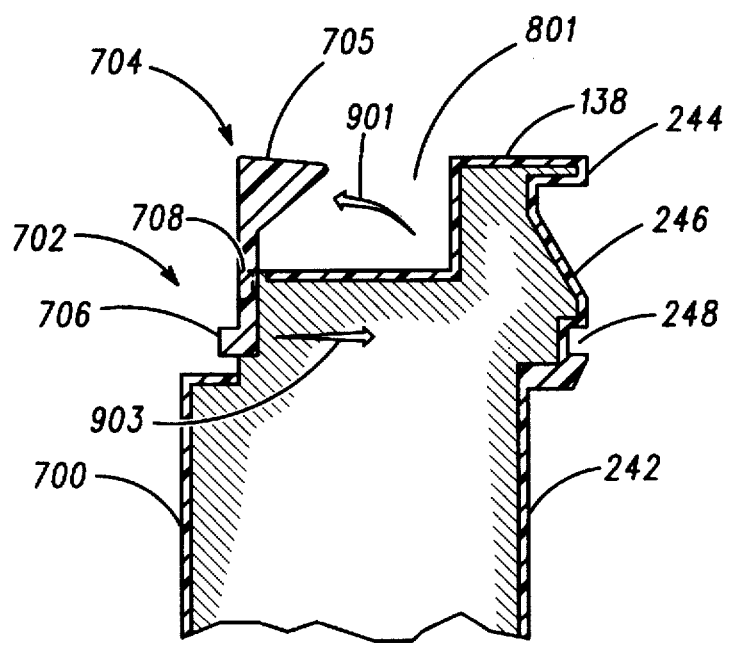
FIG. 9 illustrates a fragmentary cross-sectional view of the battery continuation apparatus taken along section lines 9—9 in FIG. 6.

The torsion bar 708 biases the flexible latch mechanism 704 to the position illustrated in FIG. 9. In this position, the projecting catch 706 will be received in the rectangular recess 204 when the battery continuation apparatus 104 is fully attached to the portable radiotelephone 100. The flexible latch mechanism 404 is actuated by exerting a force on actuatable release button 705 in the direction of arrow 901. In response, the actuatable release button 705 moves in the direction of arrow 901 to pivot around the torsion bar 708. This pivoting moves the projecting catch 706 in the direction of arrow 903 and out of the rectangular recess 204 of the portable radiotelephone 100.

Figure 10:
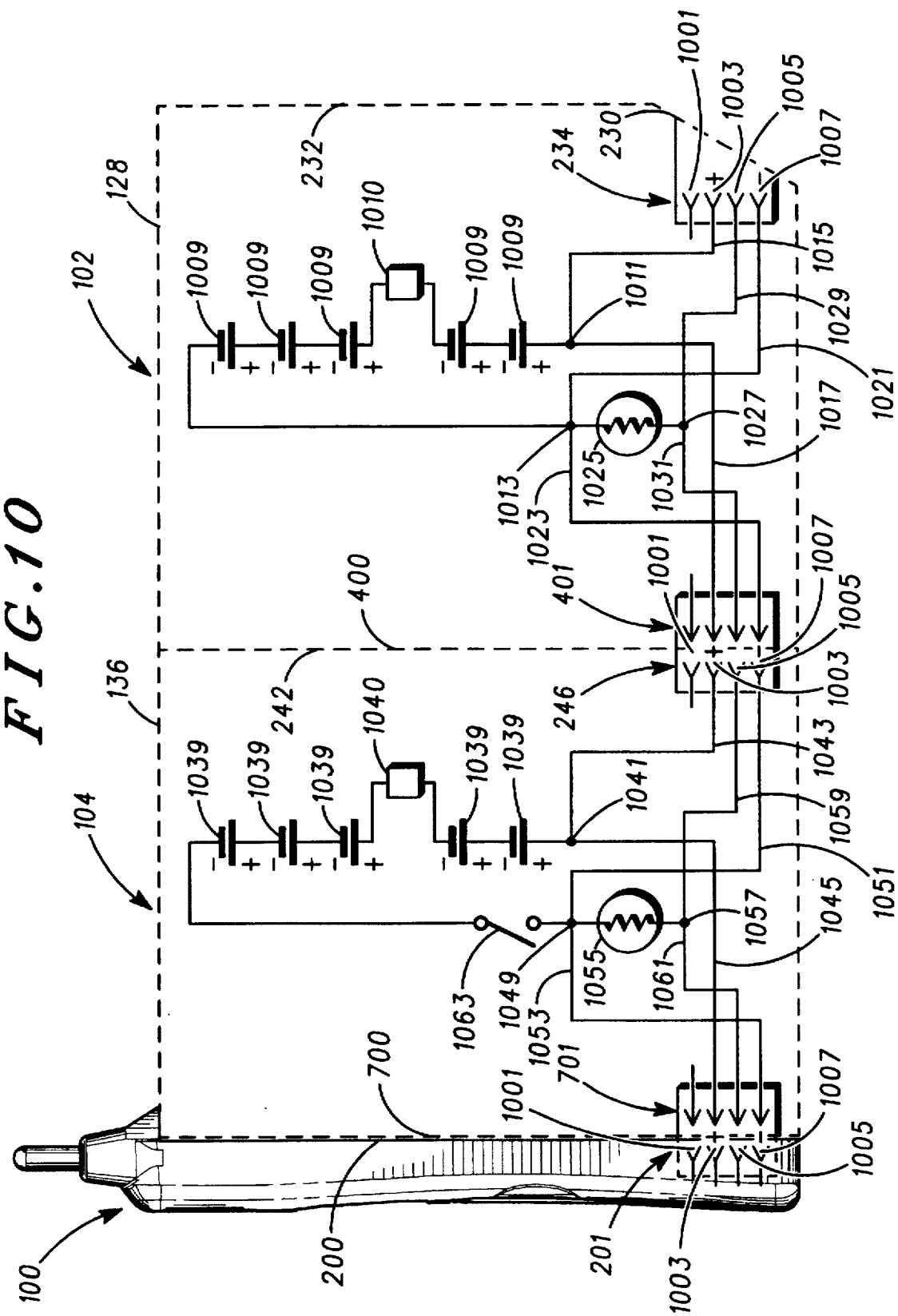
FIG. 10 is a circuit schematic diagram of the battery continuation apparatus and the battery pack attached to the portable electronic device.

FIG. 10 is a circuit schematic diagram of the battery continuation apparatus 104 and the battery pack 102 attached to the portable radiotelephone 100. The recharging contacts 234 and the flat contacts 401 of the battery pack 102, the retractable contacts 246 and the flat contacts 701 of the battery continuation apparatus 104, and the projecting contacts 201 of the portable radiotelephone 100 each include a "Hi-Cap positive" terminal 1001, a positive terminal 1003, a thermistor sense terminal 1005, and a negative or ground terminal 1007.

The battery pack 102 includes a plurality of electrochemical cells 1009 disposed within the battery pack housing 128. The plurality of electrochemical cells 1009 are generally coupled between the flat contacts 401 on the front surface 400 and the recharging contacts 234 on the bottom surface 230. Coupled among the plurality of electrochemical cells 1009 is a fuse 1010 for providing overcurrent protection.

Each of the plurality of electrochemical cells 1009 include a positive terminal (+) and a negative terminal (−). The plurality of electrochemical cells 1009 are serially coupled such that a positive polarity exists at, for example, a first node 1011 and a negative polarity exists at, for example, a second node 1013. The positive polarity at the first node 1011 is coupled to the positive terminal 1003 of both the recharging contacts 234 and the flat contacts 401 via a first wire 1015 and a second wire 1017, respectively. The negative polarity at the second node 1013 is coupled to the negative terminal 1007 of both the recharging contacts 234 and the flat contacts 401 via a third wire 1021 and a fourth wire 1023, respectively.

A thermistor 1025, coupled between the second node 1013 and a third node 1027, provides a resistance at the third node 1027. The third node 1027 is coupled between the thermistor sense terminal 1005 of both the recharging contacts 234 and the flat contacts 401 via a fifth wire 1029 and a sixth wire 1031, respectively. The resistance of the thermistor 1025 is used to detect the temperature of the plurality of electrochemical cells 1009. As a result, a charger, such as that discussed in U.S. Pat. No. 5,028,859 entitled "Multiple Battery, Multiple Rate Battery Charger" by Johnson et al. and assigned to Motorola, Inc., coupled to the battery pack 102 can use such temperature information to optimize the charging rate.

The recharging contacts 234 and the flat contacts 401 include a "Hi-Cap positive" terminal 1001. The "Hi-Cap positive" terminal 1001 can be used by a charger (not shown) as well as the portable radiotelephone 100 to determine the identity of the plurality of electrochemical cells 1009 for charging and discharging optimization, respectively. Such determination is accomplished by coupling a resistive network having a value corresponding to the plurality of electrochemical cells 1009 to the "Hi-Cap positive" terminal 1001. Usage of the "Hi-Cap positive" terminal 1001 for battery type detection by the charger and the radiotelephone is discussed in U.S. Pat. Nos. 5,164,652 and 5,237,257 both entitled "Method and Apparatus for Determining Battery Type and Modifying Operating characteristics" by Johnson et al. and assigned to Motorola, Inc.

The battery continuation apparatus 104 includes a plurality of electrochemical cells 1039 that are serially connected and disposed within the battery continuation apparatus housing 136. The plurality of electrochemical cells 1039 are generally coupled between the flat contacts 701 on the front surface 700 and the retractable contacts 246 associated with the rear surface 242. Each of the plurality of electrochemical cells 1009 includes a positive terminal (+) and a negative terminal (−). Coupled among the plurality of electrochemical cells 1039 is a fuse 1040 for providing overcurrent protection.

A positive polarity of the plurality of electrochemical cells 1039 is present at a fourth node 1041. The fourth node 1041 is coupled to the positive terminal 1003 of both the retractable contacts 246 and the flat contacts 701 via a seventh wire 1043 and an eighth wire 1045, respectively.

A fifth node 1049 is generally located between the negative polarity of the plurality of electrochemical cells 1039 and the retractable contacts 246 and the flat contacts 701. More specifically, the fifth node 1049 is further coupled to the negative terminal 1007 of both the retractable contacts 246 and the flat contacts 701 via a ninth wire 1051 and a tenth wire 1053, respectively. A thermistor 1055 having a resistance that is used to detect the temperature of the plurality of electrochemical cells 1039 is coupled between the fifth node 1049 and a sixth node 1057. The sixth node 1057 is coupled between the thermistor sense terminal 1005 of both the retractable contacts 246 and the flat contacts 701 via an eleventh wire 1059 and a twelfth wire 1061, respectively.

Unlike the battery pack 102, the battery continuation apparatus 104 includes a switch 1063 coupled between the negative polarity of the plurality of electrochemical cells and the fifth node 1049. The switch 1063 is opened when a battery pack 102 or a second battery continuation apparatus is attached to the battery continuation apparatus 104 via the rear surface 242 and remains closed when the rear surface 242 is unoccupied.

FIG. 10 shows the battery continuation apparatus 104 attached between the portable radiotelephone 100 and the battery pack 102 and the switch 1063 in an opened position. In this scenario, the battery continuation apparatus 104 is bypassed and the battery pack 102 supplies power to the portable radiotelephone 100. As is shown, the plurality of electrochemical cells 1039 of the battery continuation apparatus 104 are not supplying voltage across both the positive terminal 1003 and the negative terminal 1007 of the projecting contacts 201. In addition, the plurality of electrochemical cells 1039 are not being charged by the plurality of electrochemical cells 1009 of the battery pack 102. Rather, the plurality of electrochemical cells 1009 of the battery pack 102 are electrically coupled to the projecting contacts 201 of the portable radiotelephone 100 to provide power as is realized in the following connections of: (1) the plurality of electrochemical cells 1009 to the second wire 1017 and the fourth wire 1023, (2) the second wire 1017 and the fourth wire 1023 to the flat contacts 401, (3) the flat contacts 401 to the retractable contacts 246, (5) the retractable contacts 246 to the seventh wire 1043 and the eighth wire 1045 as well as the ninth wire 1051 and the tenth wire 1053, (6) the seventh wire 1043 and the eighth wire 1045 as well as the ninth wire 1051 and the tenth wire 1053 to the flat contacts 701, and (7) the flat contacts 701 to the projecting contacts 201.

Figure 11:
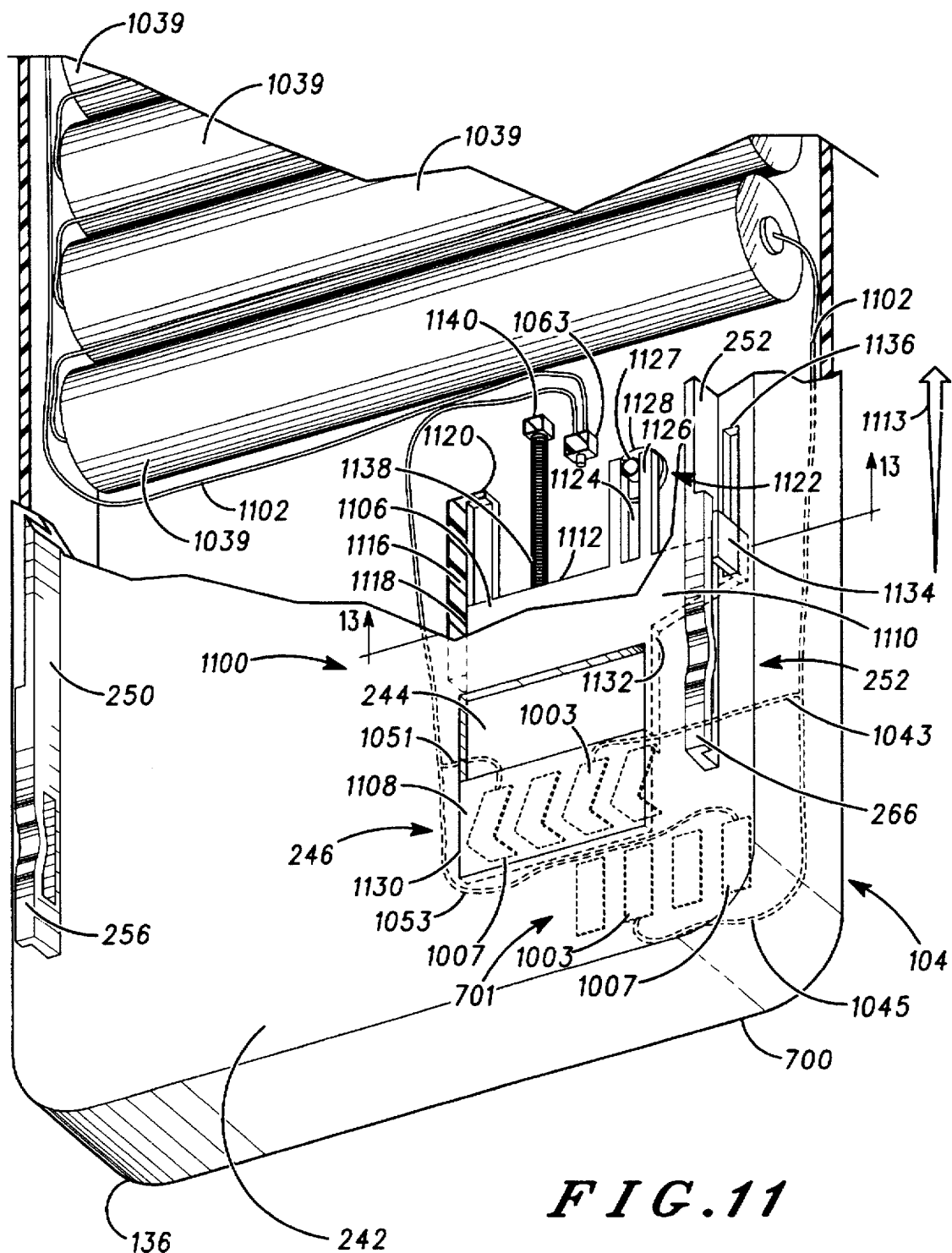
FIG. 11 illustrates an enlarged, fragmentary, cutaway view of the rear, right side, and bottom perspective view of the battery continuation apparatus of FIG. 1, showing a bypass mechanism in a first position.
Figure 12:
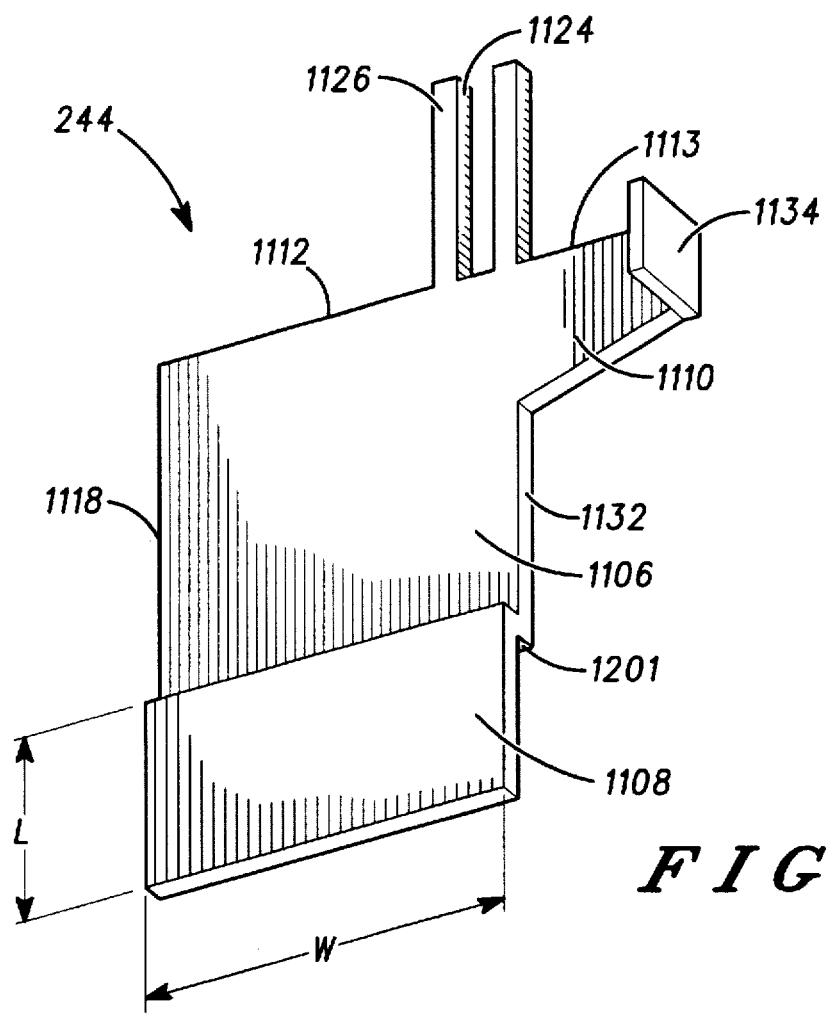
FIG. 12 illustrates a front, right side, and bottom perspective view of a slidable housing member of the bypass mechanism.

Bypassing the plurality of electrochemical cells 1039 of the battery continuation apparatus 104 is described in conjunction with FIGS. 11 through 19. FIG. 11 illustrates a bypass mechanism 1100 partially disposed within the battery continuation apparatus housing 136. The bypass mechanism includes the slidable housing member 244, which is individually illustrated in FIG. 12. The slidable housing member 244 includes a body 1106, a door 1108, and an arm 1110. The body 1106 is a substantially rectangular planar member having a bottom edge 1201, a left edge 1118, a right edge 1132, and a top edge 1112. The door 1108 is a rectangular planar member having a width W and a length L. The door 1108 extends forward from along the bottom edge 1201. The door 1108 and the body 1106 extend in parallel. The arm 1110 is a rectangular member extending substantially orthogonally from the body 1106. A top edge 1113 of the arm 1110 is coplanar with the top edge 1112 of the body 1106. A track 1126 projects outwardly from the top edges 1112, 1113 of the body 1106 and the arm 1110, respectively. The track 1126 includes a slot 1124. A detecting catch 1134 extends upwardly from a distal end of the arm 1110. The slidable housing member 244 is integrally molded of a plastic material, such as polycarbonate.

Figure 13:
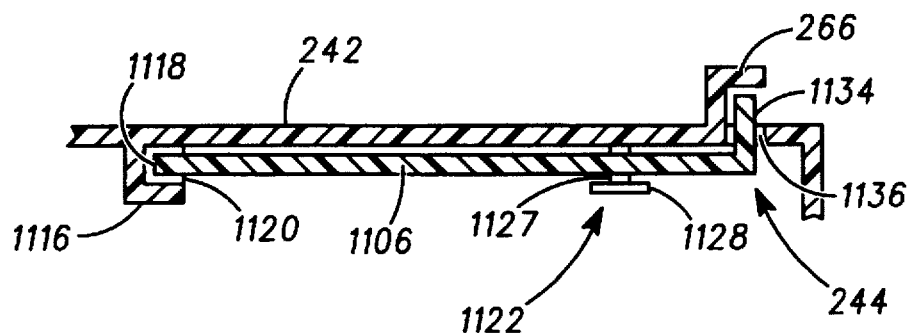
FIG. 13 illustrates a fragmentary cross-sectional view of the bypass mechanism and the battery continuation apparatus housing taken along section lines 13—13 in FIG. 11.

Referring to FIG. 13, the slidable housing member 244 is supported on a guide rail 1116 and a retainer tab 1122. The guide rail 1116 is generally L-shaped in cross-section for receipt of the body 1106. The retainer tab 1122 includes a cylindrical post 1127 and a cylindrical cap 1128 at a distal end of the cylindrical post 1127. The cylindrical cap 1128 has a larger diameter than the cylindrical post 1127. The cylindrical post 1127 diameter is dimensioned to fit within the track 1126 (see FIG. 11). The guide rail 1116 and the retainer tab 1122 are integrally molded with the underside of the rear surface 242.

Referring to FIG. 11, a square opening 1130 and an elongated housing slot 1136 are disposed on the rear surface 242 of the battery continuation apparatus housing 136. The square opening 1130 is for receipt of the door 1108. The elongated housing slot 1136 is for receipt of the detecting catch 1134. A width of the square opening 1130 is substantially equal to the width W of the door 1108. A length of the square opening 1130 is approximately twice the length L of the door 1108. A width of the elongated housing slot 1136 is substantially equal to a width of the detecting catch 1134.

The bypass mechanism 1100 further includes an anchor 1140. The anchor 1140 is mounted to an underside of the rear surface 242 of the battery continuation apparatus housing 136 proximate to the guide rail 1116 using a clip, a threaded fastener, adhesive, or the like or is formed integrally with the battery continuation apparatus housing 136. One end of a spring 1138 is attached to the anchor 1140.

The switch 1063, which also comprises a portion of the bypass mechanism 1100, is also mounted to the underside of the rear surface 242 of proximate to the track 1126 and adjacent to the anchor 1140 using a clip, a threaded fastener, adhesive, or the like, or is formed integrally with the battery continuation apparatus housing 136. The switch 1063 is coupled between a first conductor 1102, which carries the negative polarity of the plurality of electrochemical cells 1039, and the negative terminal 1007 of both the retractable contacts 246 and the flat contacts 701 via the ninth wire 1051 and the tenth wire 1053, respectively. The switch 1063 may be any normally closed switch, such as a cherry switch.

To assemble the slidable housing member 244 to the underside of the rear surface 242, the slidable housing member 244 is juxtaposed with the underside of the rear surface 242 such that the left edge 1118 of the body 1106 is inserted into the guide rail 1116. Also, the retainer tab 1122 is inserted into the slot 1124 of the track 1126, the detecting catch 1134 is inserted into the elongated housing slot 1136, and the door 1108 is inserted into the square opening 1130. In addition, the other end of the spring 1138 is attached to the top edge 1112 of the body 1106. Once assembled, the slidable housing member 244 is maintained in a juxtaposed position, parallel to the underside of the rear surface 242 as shown in FIG. 13.

The positioning of the door 1108, the detecting catch 1134, the track 1126, and the guide rail 1116 prevent lateral movement of the slidable housing member 244. The slidable housing member 244 moves a predetermined distance set by a difference between the length L and the length of the square opening 1130, the length of the slot 1124 of the track 1126, and a stop member 1120 coupled to an upper end of the guide rail 1116. The switch 1063 is positioned such that it is actuated by the top edge 1112 of the slidable housing member 244 when the predetermined distance is reached. The spring 1138 biases the door to a closed position illustrated in FIG. 11.

FIG. 14 illustrates a step of positioning the battery continuation apparatus 104 for attachment to the portable radiotelephone 100. In reference to FIGS. 2 and 7, this step of positioning is accomplished by juxtaposing the front surface 700 of the battery continuation apparatus 104 with the rear surface 200 of the portable radiotelephone 100 such that the first and second top mating ledges 722, 730 of the battery continuation apparatus 104 insert into the first and second upper gaps 217, 225 of the portable radiotelephone 100 and such that the first and second middle mating ledges 720, 728 of the battery continuation apparatus 104 insert into the first and second lower gaps 216, 224 of the portable radiotelephone 100. When positioned as such, the first and second middle ledges 212, 220 of the portable radiotelephone 100 simultaneously insert into the first and second upper mating gaps 725, 733 of the battery continuation apparatus 104. Also, the first and second bottom ledges 210, 218 of the portable radiotelephone 100 simultaneously insert into the first and second lower mating gaps 724, 732 of the battery continuation apparatus 104.

Once positioned, the battery continuation apparatus 104 is urged in the direction of arrow 1401 to effectuate complete attachment with the portable radiotelephone 100 as shown in FIG. 15. Referring also to FIGS. 2, 3, 7 and 8, this step of completely attaching is accomplished by sliding the battery continuation apparatus 104 to draw the first and second top mating ledges 722, 730 of the battery continuation apparatus 104 under the first and second top ledges 214, 222 of the portable radiotelephone 100; the first and second middle mating ledges 720, 728 of the battery continuation apparatus 104 under the first and second middle ledges 212, 220 of the portable radiotelephone 100; and the first and second bottom mating ledges 718, 726 of the battery continuation apparatus 104 under the first and second bottom ledges 210, 218 of the portable radiotelephone 100. Attachment becomes complete when the projecting catch 706 of the flexible latch mechanism 704 of the battery continuation apparatus 104 (see FIG. 9) inserts into the rectangular recess 204 of the portable radiotelephone 100. Once attached, the flat contacts 701 carried on the front surface 700 of the battery continuation apparatus 104 contact the projecting contacts 201 of the portable radiotelephone 100 and the battery continuation apparatus 104 provides power to the portable radiotelephone 100.

A step of positioning the battery pack 102 for attachment to the battery continuation apparatus 104 and the portable radiotelephone 100 is shown in FIG. 16. In reference to FIGS. 2 and 4, this step of positioning is accomplished by juxtaposing the front surface 400 of the battery pack 102 with the rear surface 242 of the battery continuation apparatus 104 such that the first and second top mating ledges 422, 430 of the battery pack 102 insert into the first and second upper gaps 263, 273 of the battery continuation apparatus 104 and such that the first and second middle mating ledges 420, 428 of the battery pack 102 insert into the first and second lower gaps 262, 272 of the battery continuation apparatus 104. When positioned as such, the first and second middle ledges 258, 268 of the battery continuation apparatus 104 simultaneously insert into the first and second upper mating gaps 425, 433 of the battery pack 102. Also, the first and second bottom ledges 256, 266 of the battery continuation apparatus 104 simultaneously insert into the first and second lower mating gaps 424, 432 of the battery pack 102. While positioned as such, it should be noted that the first and second bottom mating ledges 418, 426 of the battery pack 102 reside beneath the first and second bottom ledges 256, 266 of the battery continuation apparatus 104.

Once positioned, the battery pack 102 is urged in the direction of arrow 1601 to effectuate attachment to the battery continuation apparatus 104. Referring also to FIGS. 2, 4, 5 and 6, attachment is accomplished by sliding the battery pack 102 so as to draw the first and second top mating ledges 422, 430 of the battery pack 102 under the first and second top ledges 260, 270 of the battery continuation apparatus 104; the first and second middle mating ledges 420, 428 of the battery pack 102 under the first and second middle ledges 258, 268 of the battery continuation apparatus 104; and the first and second bottom mating ledges 418, 426 of the battery pack 102 under the first and second bottom ledges 256, 266 of the battery continuation apparatus 104. Referring also to FIG. 11, as the first bottom mating ledge 418 of the battery pack 102 is drawn under the first bottom ledge 266 of the battery continuation apparatus 104, a top of the first bottom mating ledge 418 abuts against a bottom of the detecting catch 1134. As the battery pack 102 continues to be attached, the first bottom mating ledge 418 pushes the detecting catch 1134 in the direction of arrow 1113 thereby compressing the spring 1138. As the detecting catch 1134 is pushed, the slidable housing member 244 including the door 1108 moves in the direction of the arrow 1113 unconcealing the retractable contacts 246.

Figure 17:
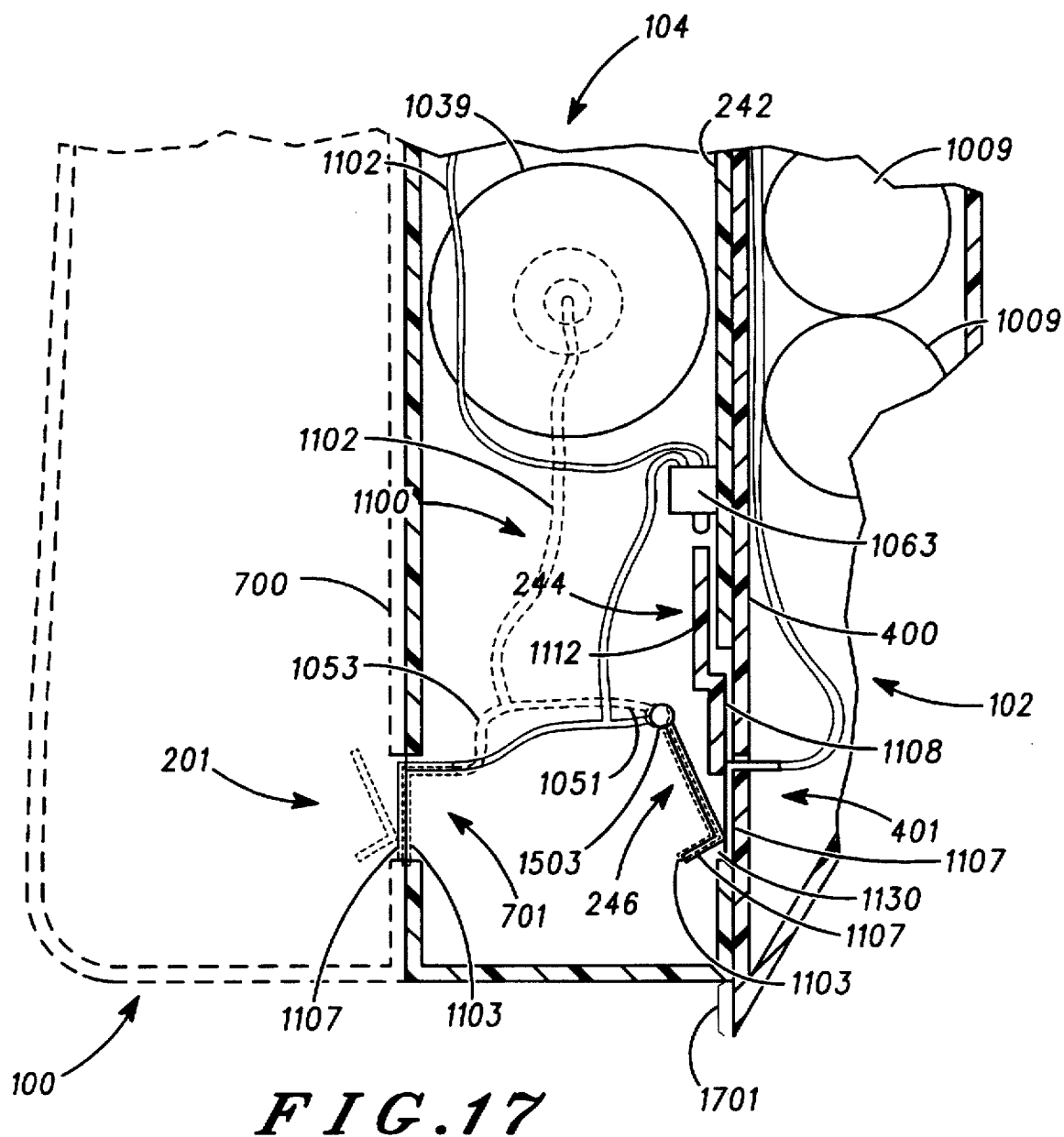
FIG. 17 illustrates an enlarged, fragmentary side view of the battery continuation apparatus and the battery pack taken along section lines 17—17 in FIG. 1 wherein, unlike FIG. 1, the battery pack and the battery continuation apparatus are shown just prior to complete attachment and the bypass mechanism is in a second position.

FIG. 17 illustrates an enlarged, fragmentary side view of the battery continuation apparatus 104 and the battery pack 102 just prior to complete attachment wherein the slidable housing member 244 is in a second position where the top edge 1112 has not yet actuated the switch 1063. A slight overhang 1701 at a bottom edge of the front surface 400 of the battery pack 102 with respect to the battery continuation apparatus 104 indicates that complete attachment has not yet occurred. The plurality of electrochemical cells 1039 of the battery continuation apparatus 104 power the portable radiotelephone 100. The bypass mechanism 1100 includes a spring loaded hinge 1703 mounted both to the underside of the rear surface 242 (not shown) and the retractable contacts 246. The spring loaded hinge 1703 is biased to rotate the retractable contacts 246 in a counterclockwise direction such that as the door 1108 opens, the retractable contacts 246 project through the square opening 1130. In the second position, the door 1108 is partially opened allowing the retractable contacts 246 of the battery continuation apparatus 104 to contact the flat contacts 401 of the battery pack 102 prior to actuation of the switch 1063. This contact causes the plurality of electrochemical cells 1009 of the battery pack 102 to operate in parallel with the plurality of electrochemical cells 1039 of the battery continuation apparatus 104 until attachment is complete. As a result, when attachment becomes complete and the switch 1063 is actuated, the operation of the portable radiotelephone 100 will not be interrupted when the plurality of electrochemical cells 1039 of the battery continuation apparatus 104 are bypassed. Because the time period is short during which the battery pack 102 and the battery continuation apparatus 104 operate in parallel, i.e., the time between contacting retractable contacts 246 to the flat contacts 401 and complete attachment, adverse electrical effects, such as extensive charging of the battery continuation apparatus 104 by the battery pack 102, are avoided.

Figure 19:
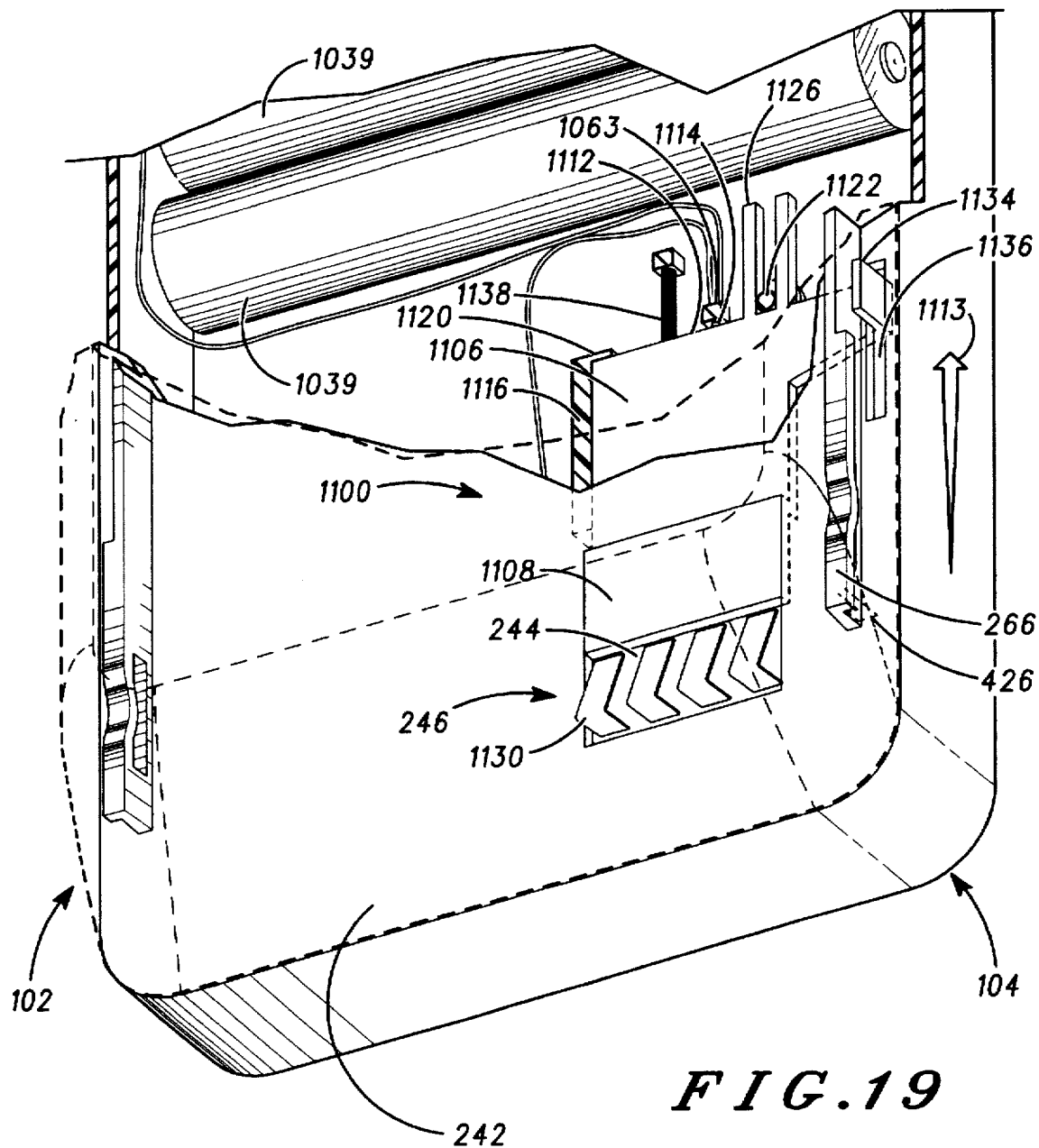
FIG. 19 illustrates the perspective view of FIG. 11 with the completely attached battery pack shown in dashed lines and the bypass mechanism in a third position.

FIGS. 18 and 19 illustrate the battery pack 102 completely attached to the battery continuation apparatus 104. When completely attached, the projecting catch 406 of the flexible latch mechanism 404 of the battery pack 102 (see FIG. 4) inserts into the rectangular recess 248 of the battery continuation apparatus 104 (see FIG. 2). In FIG. 19, the bypass mechanism 1100 is shown in a third position and described by the following: the spring 1138 is fully compressed, the detecting catch 1134 resides at a top of the elongated housing slot 1136, the door 1108 resides in an upper half of the square opening 1130, the top edge 1112 of the slidable housing member 244 rests against the stop member 1120 of the guide rail 1116, and the fixed guide tab 1122 resides at a bottom of the elongated opening 1124 formed in the track 1126. In addition, the switch 1063 is maintained in an actuated position by the top edge 1112. When actuated, the switch 1063 is opened and the plurality of electrochemical cells 1039 of the battery continuation apparatus 104 no longer provide a negative polarity to the flat contacts 701 and the projecting contacts 201 of the portable radiotelephone (see FIG. 10) and, thus, are bypassed. Power is provided to the portable radiotelephone 100 solely from the plurality of electrochemical cells 1009 of battery pack 102.

The portable radiotelephone 100 operates until depletion of the plurality of the electrochemical cells 1009 of the battery pack 102. Prior to depletion a user is alerted audibly and/or visually by a low battery alert provided by the portable radiotelephone 100. Should the user desire to continue uninterrupted operation of the portable radiotelephone 100, the user will detach the battery pack 102. Referring to FIGS. 2, 4, 5, 16, and 18, detachment of the battery pack is initiated by actuating the flexible latch mechanism 404 by depressing the actuatable release button 236 as previously discussed in relation to FIG. 4. As the actuatable release button 236 of the flexible latch mechanism 404 is depressed, the actuatable release button 236 rotates about the torsion bar 408 and moves into the indent 246 of the raised area 244 of the battery continuation apparatus 104 and the projecting catch 406 simultaneously retracts from the rectangular recess 248 of the raised area 244 of the battery continuation apparatus 104. While maintaining the actuatable release button 236 in this depressed position, the battery pack 102 can be slid in the direction opposite of arrow 1601 until it reaches the position shown in FIG. 16. While sliding, the first and second set of mating ledges 414, 416 of the battery pack 102 are drawn away from the first and second set of ledges 254, 264 of the battery continuation apparatus 104, respectively. Once the first and second top mating ledges 422, 430 reside in the first and second upper gaps 263, 273 of the battery continuation apparatus 104 and the first and second middle mating ledges 420, 428 reside in the first and second lower gaps 262, 272 of the battery continuation apparatus 104, the battery pack 102 is detached and can be moved away from the battery continuation apparatus 104. This leaves only the battery continuation apparatus 104 and the portable radiotelephone 100 attached as shown in FIG. 15.

The operation of the bypass mechanism 1100 during detachment of the battery pack 102 is substantially illustrated by FIGS. 11, 15, and 17 in reverse order. As the battery pack 102 is slid for removal, the spring 1138 expands and forces the slidable housing member 244 to move in a direction opposite of the arrow 1113. As the top edge 1112 of the slidable housing member 244 releases the switch 1063, the switch 1063 switches to a closed position unbypassing the plurality of electrochemical cells 1039 of the battery continuation apparatus 104 and, thus, coupling the plurality of electrochemical cells 1039 in parallel with the plurality of electrochemical cells 1009 of the battery pack 102. As the slidable housing member 244 continues to move in the direction opposite of the arrow 1113, the bottom edge of the door 1108 pushes downward on the retractable contacts 246 causing the spring loaded hinge 1703 (see FIG. 17) to rotate clockwise and retract into the rear surface 242 of the battery continuation apparatus 104. As the retractable contacts 246 retract, electrical contact with flat contacts 401 of the battery pack 102 is broken and the plurality of electrochemical cells 1009 of the battery pack are no longer in parallel with the plurality of electrochemical cells 1039 of the battery continuation apparatus 104. Interruption to the operation of the portable radiotelephone 100 does not occur because the switch 1063 switches to a closed position coupling the plurality of electrochemical cells 1039 of the battery continuation apparatus 104 to the portable radiotelephone 100 prior to disconnecting the retractable contacts 246 from the flat contacts 401 of the battery pack. Once the battery pack 102 is detached, the bypass mechanism 1100 is positioned as shown in FIG. 11 such that the detecting catch 1134 resides at the bottom of the elongated housing slot 1136, the door 1108 conceals the retractable contacts 246, and the plurality of electrochemical cells 1039 of the battery continuation apparatus 104 solely power the portable radiotelephone 100.

To extend the continuous operation of the portable radiotelephone 100, it is envisioned that a user will "piggyback" or attach multiple battery continuation apparatuses to the portable radiotelephone 100. FIG. 20 illustrates positioning a second battery continuation apparatus 2001 for attachment to the battery continuation apparatus 104. The second battery continuation apparatus 2001 is positioned with respect to the battery continuation apparatus 104 in the same manner as the battery pack 102 (see FIGS. 16–19). The second battery continuation apparatus 1801 is then urged in the direction described by arrow 2003 until completely attached as shown in FIG. 21. As the second battery continuation apparatus 1801 is attached, the bypass mechanism 1100 of the battery continuation apparatus 104 operates as described with respect to the battery pack 102 and as illustrated in FIGS. 11–19. Upon complete attachment, the battery continuation apparatus 104 bypasses the plurality of electrochemical cells 1039 therein allowing the second battery continuation apparatus 2001 to power the portable radiotelephone 100.

The user positions and attaches the battery pack 102 to the second battery continuation apparatus 2001 as illustrated in FIGS. 22 and 23. Upon attachment of the battery pack 102, the second battery continuation apparatus 2001 bypasses the plurality of electrochemical cells therein and couples the power provided by the battery pack 102 through to the battery continuation apparatus 104. With the plurality of electrochemical cells 1039 of the battery continuation apparatus 104 also bypassed, the portable radiotelephone 100 operates via the power provided by the battery pack 102. The bypassing concept of the battery continuation apparatuses 104, 2001 ensures that the outermost power providing source is depleted first. As a result, the power providing source is readily accessible for removal when it nears depletion.

While configured as shown in FIG. 23, the battery continuation apparatuses 104, 2001 can be detached from the portable radiotelephone 100. Detachment of both the battery pack 102 and the second battery continuation apparatus 2001 can be accomplished by detaching just the second battery continuation apparatus 2001. During detachment, unbypassing of the battery continuation apparatus 104 occurs as previously described in relation to the detachment of the battery pack 102. Detachment of the battery continuation apparatus 104, the second battery continuation apparatus 2001, and the battery pack 102 can be accomplished by detaching just the battery continuation apparatus 104. Referring to FIGS. 2 and 6–9, detachment of the battery continuation apparatus 104 is initiated by actuating the flexible latch mechanism 704 in the manner previously discussed in relation to FIG. 9. As the actuatable release button 705 of the flexible latch mechanism 704 is actuated, the actuatable release button 236 moves into the indent 246 of the raised area 202 of the portable radiotelephone 100 and the projecting catch 706 retracts from the rectangular recess 204 of the raised area 202 of the portable radiotelephone 100. While maintaining the actuatable release button 705 in this actuated position, the battery continuation apparatus 104 (and the second battery continuation apparatus 2001 and the battery pack 102) can be slid towards detachment. While sliding, the first and second set of mating ledges 714, 716 of the battery continuation apparatus 104 are drawn away from the first and second set of ledges 209, 217 of the portable radiotelephone 100, respectively. Once the first and second top mating ledges 722, 730 reside in the first and second upper gaps 217, 225 of the portable radiotelephone 100 and the first and second middle mating ledges 720, 728 reside in the first and second lower gaps 216, 224 of the portable radiotelephone 100, the battery continuation apparatus 104 is detached and can be moved away from the portable radiotelephone 100. Detachment of the battery continuation apparatus 104 removes power from the portable radiotelephone.

Aside from the aforementioned mechanical aspects, the slidable housing member 244 serves both a protective purpose as well as a cosmetic purpose. With the rear surface 242 of the battery continuation apparatus 104 unoccupied and the slidable housing member 244 closed, the retractable contacts 246 and the bypass mechanism 1100, in general, are protected from dust and other contaminates. The retractable contacts 246 are also protected from direct physical damage. The appearance of the battery continuation apparatus 104 is enhanced by concealing the retractable contacts 246, which are comprised of a metallic material that cosmetically clashes with the plastic comprising the battery continuation apparatus housing 136.

For cosmetic and charging purposes, a dummy housing cover (not shown) can be attached to the rear surface 242 of the battery continuation apparatus 104. The dummy housing cover is molded to be substantially similar in appearance to the battery pack housing 128 but without electrochemical cells disposed therein. A bottom surface (not shown) of the dummy cover includes charging contacts (not shown) similar to the charging contacts 234 disposed on the battery pack 102. A front surface (not shown) of the dummy cover includes flat contacts (not shown) similar to the flat contacts 401 disposed on the battery pack 102. The charging contacts are shorted to the flat contacts through the dummy housing cover. The front surface includes a first channel with a first set of mating ledges (not shown) and a second channel with a second set of mating ledges (not shown) similar to those of the battery pack 102. However, a lower ledge (not shown) of the first and second set of mating ledges is modified to only partially move the slidable housing member 244 during attachment. The slidable housing member 244 is prevented from actuating the switch 1063 when the dummy cover is attached. The lower ledge moves the slidable housing member 244 enough to permit the retractable contacts 246 of the battery continuation apparatus 104 to contact the flat contacts of the dummy cover. When attached, the plurality of electrochemical cells 1039 of the battery continuation apparatus 104 may be charged by placing the battery continuation apparatus 104 with the attached dummy cover in a charger such as the charger disclosed in U.S. Pat. No. 5,028,859 by Johnson et al. previously cited.

Figure 24:
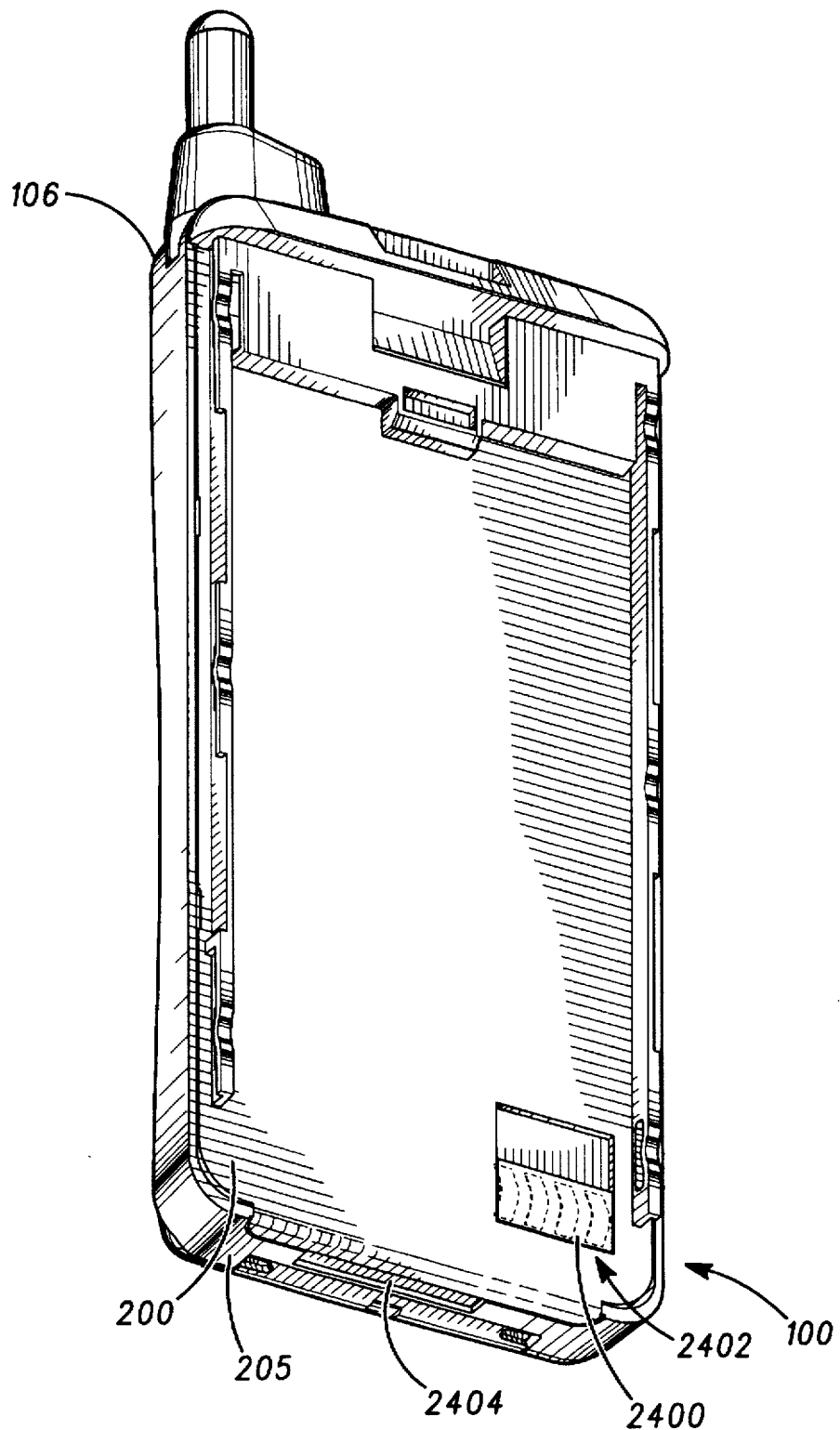
FIG. 24 illustrates a portable radiotelephone employing the bypass mechanism of FIGS. 11, 12, 13, 17, and 19.

In light of the aforementioned advantages of the slidable housing member 244, it is envisioned to employ the slidable housing member 244 on the electronic device, itself. FIG. 24 illustrates the portable radiotelephone 100 of FIG. 1 employing a radio slidable housing member 2400 and having retractable radio contacts 2402 concealed therebeneath. A radiotelephone bypass mechanism (not shown), similar to the bypass mechanism 1100 (see FIG. 11), is disposed against an underside of the rear surface 200 of the radiotelephone housing 106 and unconceals the retractable radio contacts 2402 when the battery continuation apparatus 104 or the battery pack 102 is attached. Upon complete attachment of the battery continuation apparatus 104 or the battery pack 102 to the portable radiotelephone 100, a switch (not shown) included in the radiotelephone bypass mechanism switches the transceiver circuit from receiving power from an external port 2404 disposed on the bottom surface 205, where power is provided via, for example, a vehicle adapter, to the retractable radio contacts 2402, now unconcealed, which provides battery power.

Although the preferred embodiment discloses a mechanical bypass mechanism 1100 (see FIG. 11) disposed within the battery continuation apparatus housing 136, it will be recognized that the bypass mechanism 1100 could be provided by a microprocessor circuit (not shown). The microprocessor circuit detects stages of attachment of the battery pack 102 or additional battery continuation apparatuses to the battery continuation apparatus 104 via an optical sensor (not shown) or a magnetic reedswitch (not shown). The microprocessor circuit controls movement of the slidable housing member 244 via a motor (not shown) coupled thereto. In addition, rather than requiring a user to manually detach the outwardly positioned power providing device (a battery pack or additional battery continuation apparatus) prior to its depletion to effectuate a bypass and continue operation of the portable radiotelephone 100, the microprocessor circuit equipped with fast switches automatically manages the attached power providing devices as they become depleted. With the ability to bypass and unbypass any of the attached power providing devices, the microprocessor circuit ensures continuous uninterrupted operation of the portable radiotelephone 100 without requiring the user to manually detach (and replace) power providing devices as they near depletion.

In summary, the battery continuation apparatus includes a bypass mechanism and an electrochemical cell for powering a portable electronic device. When the battery continuation apparatus is coupled between the portable electronic device and an alternative power supply, the battery continuation apparatus is bypassed such that the portable electronic device is powered via the alternative power supply. While the portable electronic device is being powered from the electrochemical cell in the battery continuation apparatus, the operation of the portable electronic device can be extended by coupling the alternative power supply to the battery continuation apparatus. Upon coupling, the operation of the portable electronic device is not interrupted as the battery continuation apparatus is bypassed. Similarly, upon removal of the alternative power supply from the battery continuation apparatus, the battery continuation apparatus is unbypassed without interruption to the operation of the portable electronic device. In such a scenario, the outermost power providing source is depleted first. By coupling multiple battery continuation apparatuses to the portable electronic device and subsequently removing (and replacing) the outermost battery continuation apparatus as it nears depletion, the continuous operation of the portable electronic device is extended.

We claim:

1. A battery continuation apparatus comprising:
   a housing;
   a first contact positioned on said housing to connect to a first device;

at least one electrochemical cell positioned in said housing to provide a first source of power to the first device;

a second contact positioned on said housing to connect to a second device, the second device to provide a second source of power; and a bypass mechanism coupled to said at least one electrochemical cell, said first contact, and said second contact, said bypass mechanism to automatically connect said at least one electrochemical cell to said first contact when said second contact is unconnected to the second device and to isolate the at least one electrochemical cell from the second device when said second contact is connected to the second device.

2. A battery continuation apparatus according to claim 1 wherein said bypass mechanism comprises:

a conductor coupled between said first contact and said second contact;.

a switch coupled between said first contact and said at least one electrochemical cell; and a switch control coupled in proximity to said switch to control said switch to connect said first contact to said at least one electrochemical cell to provide the first source of power to the first device and, alternatively, to disconnect said first contact from said at least one electrochemical cell and, thereby provide the second source of power to the first device when the second device is connected to said second contact.

3. A battery continuation apparatus according to claim 2 wherein said switch control includes a detector to detect connection of the second device.

4. A battery continuation apparatus comprising:

a housing;

a first contact positioned on said housing to connect to a first device;

at least one electrochemical cell positioned in said housing to provide a first source of power to the first device;

a second contact positioned on said housing to connect to a second device, the second device to provide a second source of power; and a bypass mechanism coupled to said at least one electrochemical cell, said first contact, and said second contact, said bypass mechanism including a door member to selectively conceal said second contact, said bypass mechanism to automatically connect said at least one electrochemical cell to said first contact only when said second contact is unconnected to the second device.

5. A battery continuation apparatus according to claim 4 wherein said door member is positioned to conceal said second contact when the second device is not connected thereto and to expose said second contact just prior to connection of the second device thereto.

6. A battery continuation apparatus comprising:

a housing;

a first contact positioned on said housing to connect to a first device;

at least one electrochemical cell positioned in said housing to provide a first source of power to the first device;

a second contact positioned on said housing to connect to a second device, the second device to provide a second source of power;

an actuatable release mechanism carried on said housing to release the battery continuation apparatus from the first device; and a bypass mechanism coupled to said at least one electrochemical cell, said first contact, and said second contact, said bypass mechanism to automatically connect said at least one electrochemical cell to said first contact only when said second contact is unconnected to the second device.

7. A battery continuation apparatus according to claim 6 wherein said housing includes a first side for juxtapositioning with the first device, a second side for juxtapositioning with the second device, and a third side extending between said first side and said second side, said actuatable release mechanism carried on said third side to facilitate access to the actuatable release mechanism.

8. An assembly comprising:

a battery powered device having a first mating apparatus; and a first battery continuation apparatus having a first housing, a first depletable power source disposed in said first housing, a second mating apparatus carried on one side of said first housing, and a third mating apparatus carried on another side of said first housing opposite said one side thereof, said second mating apparatus releasably mated to said first mating apparatus of said battery powered device, said first battery continuation apparatus to provide said first depletable power source to said battery powered device when said first and second mating apparatuses are releasably mated and said third mating apparatus is unmated and said first battery continuation apparatus isolates said first depletable power source when said third mating apparatus is mated.

9. An assembly comprising:

a battery powered device having a first mating apparatus;

a first battery continuation apparatus having a first housing, a first depletable power source disposed in said first housing a second mating apparatus carried on one side of said first housing, and a third mating apparatus carried on another side of said first housing opposite said one side thereof, said second mating apparatus releasably mated to said first mating apparatus of said battery powered device, said first battery continuation apparatus to provide said first depletable power source to said battery powered device only when said first and second mating apparatuses are releasably mated and said third mating apparatus is unmated; and a second battery continuation apparatus having a second housing, a second depletable power source disposed in said second housing, a fourth mating apparatus carried on one side of said second housing, and a fifth mating apparatus carried on another side of said second housing opposite to said one side thereof, said fourth mating apparatus releasably mated to said third mating apparatus of said first battery continuation apparatus, said second battery continuation apparatus to provide said second depletable power source to said battery powered device via said first battery continuation apparatus only when said first and second mating apparatuses are releasably mated, said third and fourth mating apparatuses are releasably mated, and said fifth mating apparatus is unmated.

10. An assembly according to claim 9 further comprising a battery pack having a third housing, a third depletable power source disposed in said third housing, and a sixth mating apparatus carried on one side of said third housing, said sixth mating apparatus releasably mated to said fifth mating apparatus of said second battery continuation apparatus, said battery pack to provide said third depletable power source to said battery powered device via said first and second battery continuation apparatuses only when said first and second mating apparatuses are releasably mated, said third and fourth mating apparatus are releasably mated, and said fifth and sixth mating apparatuses are unmated.

11. An assembly comprising:
a battery powered device having a first mating apparatus;
a first battery continuation apparatus having a first housing, a first depletable power source disposed in said first housing, a second mating apparatus carried on one side of said first housing, and a third mating apparatus carried on another side of said first housing opposite said one side thereof, said second mating apparatus releasably mated to said first mating apparatus of said battery powered device, said first battery continuation apparatus to provide said first depletable power source to said battery powered device only when said first and second mating apparatuses are releasably mated and said third mating apparatus is unmated; and
a battery pack having a second housing, a second depletable power source disposed in said second housing, and a fourth mating apparatus carried on one side of said second housing, said fourth mating apparatus releasably mated to said third mating apparatus of said first battery continuation apparatus, said battery pack to provide said second depletable power source to said battery powered device via said first battery continuation apparatus only when said first and second mating apparatuses are releasably mated and said third and fourth mating apparatuses are releasably mated.

12. An assembly comprising:
a battery powered device having a first mating apparatus; and
a first battery continuation apparatus having a first housing, a first depletable power source disposed in said first housing, a second mating apparatus carried on one side of said first housing, a third mating apparatus carried on another side of said first housing opposite said one side thereof, and a door slidably carried on said another side of the said first housing, said second mating apparatus comprising a first contact, said second mating apparatus releasably mated to said first mating apparatus of said battery powered device, said third mating apparatus comprising a second contact, said second contact movably disposed behind said door, said door to conceal said second contact when said third mating apparatus is unmated and to reveal said second contact during mating of said third mating apparatus, said first battery continuation apparatus to provide said first depletable power source to said battery powered device only when said first and second mating apparatuses are releasably mated and said third mating apparatus is unmated.

13. An assembly according to claim 9 wherein said second housing of said second battery continuation apparatus further comprises a third side extending between said one and another sides of said second housing, said third side comprising a release mechanism accessibly located, said release mechanism actuatable to release said second battery continuation apparatus from the assembly without releasing any of said first battery continuation apparatus and said battery powered device.

14. A battery continuation apparatus comprising:
a housing;
a first contact positioned on said housing to connect to a first device;

at least one electrochemical cell positioned in said housing to provide a first source of power;
a second contact positioned on said housing to connect to a second device, the second device to provide a second source of power;
a pair of uninterrupted conductor coupled to said first and second contacts; and
a bypass mechanism coupled to said at least one electrochemical cell and said pair of uninterrupted conductor, said bypass mechanism to connect said at least one electrochemical cell across said pair of uninterrupted conductors when said second contact us not connected to the second device such that said pair of uninterrupted conductors delivers the first source of power to the first device, and said bypass mechanism to disconnect said at least one electrochemical cell from across said pair of uninterrupted conductors when said second contact is not connected to the second device such that said pair of uninterrupted conductors delivers the first source of power to the first device.

15. A battery continuation apparatus according to claim 14 wherein said bypass mechanism comprises:
a switch coupled between said uninterrupted conductor and said at least one electrochemical cell; and
a switch control coupled in proximity to said switch and said second contact to control said switch, responsive to connection of the second device to said second contact, to connect said at least one electrochemical cell to said uninterrupted conductor and, alternatively, to disconnect said at least one electrochemical cell from said uninterrupted conductor.

16. A battery continuation apparatus comprising:
a housing;
a first contact positioned on said housing to connect to a first device;
at least one electrochemical cell positioned in said housing to provide a first source of power;
a second contact positioned on said housing to connect to a second device, the second device to provide a second source of power;
an uninterrupted conductor coupled to said first and second contacts; and
a bypass mechanism coupled to said at least one electrochemical cell and said uninterrupted conductor, said bypass mechanism comprising a door slidably carried on said housing, said second contact movably disposed behind said door, said door to conceal said second contact when said second contact is unconnected to the second device and to reveal said second contact to permit electrical connection with the second device prior to connection thereof to said second contact, said bypass mechanism to connect said at least one electrochemical cell to said uninterrupted conductor when said second contact is not connected to the second device such that said uninterrupted conductor delivers the first source of power to the first device, and said bypass mechanism to disconnect said at least one electrochemical cell from said uninterrupted conductor when said second contact is connected to the second device such that said uninterrupted conductor delivers the second source of power to the first device.

17. A battery continuation apparatus comprising:
a housing having a first side and a second side opposite said first side;
a depletable power source disposed in said housing;

a first mating apparatus carried on said first side;

a second mating apparatus carried on said second side; and a bypass mechanism coupled to said depletable power source and said first and second mating apparatuses, said bypass mechanism to electrically connect said depletable power source to said first mating apparatus when said second mating apparatus is unmated and to electrically isolate said depletable power source when said second mating apparatus is mated.

18. A battery continuation apparatus comprising:

a housing having a first side and a second side opposite said first side;

a depletable power source disposed in said housing;

a first mating apparatus carried on said first side, said first mating apparatus comprising a first contact;

a second mating apparatus carried on said second side, said second mating apparatus comprising a second contact, said second contact connected to said first contact; and a bypass mechanism coupled to said depletable power source and said first and second mating apparatuses, said bypass mechanism comprising a door slidably carried on said housing, said second contact movably disposed behind said door, said door to conceal said second contact when said second mating apparatus is unmated and to reveal said second contact when said second mating apparatus is mated, and said bypass mechanism to electrically connect said depletable power source to said first mating apparatus only when said second mating apparatus is unmated.

19. A battery continuation apparatus comprising:

a housing having a first side and a second side opposite said first side;

a depletable power source disposed in said housing;

a first mating apparatus carried on said first side;

a second mating apparatus carried on said second side; and a bypass mechanism coupled to said depletable power source and said first and second mating apparatuses, said bypass mechanism comprising a switch coupled between said depletable power source and said first mating apparatus, said switch to electrically connect said depletable power source to said first mating apparatus and, alternatively, to electrically disconnect said depletable power source from said first mating apparatus, said bypass mechanism to electrically connect said depletable power source to said first mating apparatus only when said second mating apparatus is unmated.

20. A battery continuation apparatus comprising:

a housing;

a first contact positioned on said housing to connect to a first device;

at least one electrochemical cell positioned in said housing to provide a first source of power to the first device;

a second contact positioned on said housing to connect to a second device, the second device to provide a second source of power;

a switch coupled to said at least one electrochemical cell and said first contact to selectively connect said at least one electrochemical cell to said first contact and selectively bypass said at least one electrochemical cell when the second device is connected to said second contact; and a door carried on said housing to selectively conceal said second contact when the second device is not connected thereto and to selectively reveal said second contact during connection of the second device thereto.

* * * * *

UNITED STATES PATENT AND TRADEMARK OFFICE
CERTIFICATE OF CORRECTION

PATENT NO. : 5,738,954
DATED : April 14, 1998
INVENTOR(S) : Latella et al.

It is certified that error appears in the above-indentified patent and that said Letters Patent is hereby corrected as shown below:

In Claim 9, Line 5, delete "housing"; insert therefor --housing,--.

In Claim 14, Line 10, delete "conductor"; insert therefor --conductors--.

In Claim 14, Line 13, delete "conductor"; insert therefor --conductors--.

Signed and Sealed this

Eighteenth Day of August, 1998

Attest:

BRUCE LEHMAN

*Attesting Officer*    *Commissioner of Patents and Trademarks*